United States Patent
Akimoto

(10) Patent No.: US 10,802,832 B2
(45) Date of Patent: Oct. 13, 2020

(54) INFORMATION PROCESSING DEVICE AND METHOD OF CONTROLLING COMPUTERS

(71) Applicant: FUJITSU LIMITED, Kawasaki-shi, Kanagawa (JP)

(72) Inventor: Hideyuki Akimoto, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 175 days.

(21) Appl. No.: 16/207,232

(22) Filed: Dec. 3, 2018

(65) Prior Publication Data

US 2019/0187998 A1 Jun. 20, 2019

(30) Foreign Application Priority Data

Dec. 15, 2017 (JP) .................. 2017-240761

(51) Int. Cl.
```
G06F 1/32      (2019.01)
G06F 1/3203    (2019.01)
G06F 1/3234    (2019.01)
G06F 1/3287    (2019.01)
G06F 1/3296    (2019.01)
G06F 9/4401    (2018.01)
G06F 1/26      (2006.01)
```

(52) U.S. Cl.
CPC .............. *G06F 9/4401* (2013.01); *G06F 1/26* (2013.01)

(58) Field of Classification Search
CPC ........ G06F 1/3234; G06F 1/32; G06F 1/3203; G06F 1/3287
See application file for complete search history.

(56) References Cited

U.S. PATENT DOCUMENTS

| 6,711,691 B1 * | 3/2004 | Howard | G06F 1/3203 713/300 |
| 2008/0222434 A1 * | 9/2008 | Shimizu | G06F 9/5027 713/300 |
| 2013/0262905 A1 * | 10/2013 | Yamauchi | G06F 1/329 713/340 |

FOREIGN PATENT DOCUMENTS

| JP | 2003-162515 | 6/2003 |
| JP | 2008-225639 | 9/2008 |

* cited by examiner

*Primary Examiner* — Jaweed A Abbaszadeh
*Assistant Examiner* — Hyun Soo Kim
(74) *Attorney, Agent, or Firm* — Fujitsu Patent Center

(57) ABSTRACT

An information processing device includes a processor that calculates a first energy consumption of a first computer during a boot latency when the first computer has already booted and is not executing any job. The boot latency is time taken for boot of a second computer scheduled to execute a second job with the first computer after a first job executed by the first computer. The processor calculates a second energy consumption of the second computer during a waiting time when the second computer has already booted and is not executing any job. The waiting time is obtained by subtracting the boot latency from a time difference between a scheduled end time of the first job and a present time. The processor powers on the second computer when power of the second computer is off and when the second energy consumption becomes equal to or less than a threshold value.

6 Claims, 25 Drawing Sheets

FIG.10
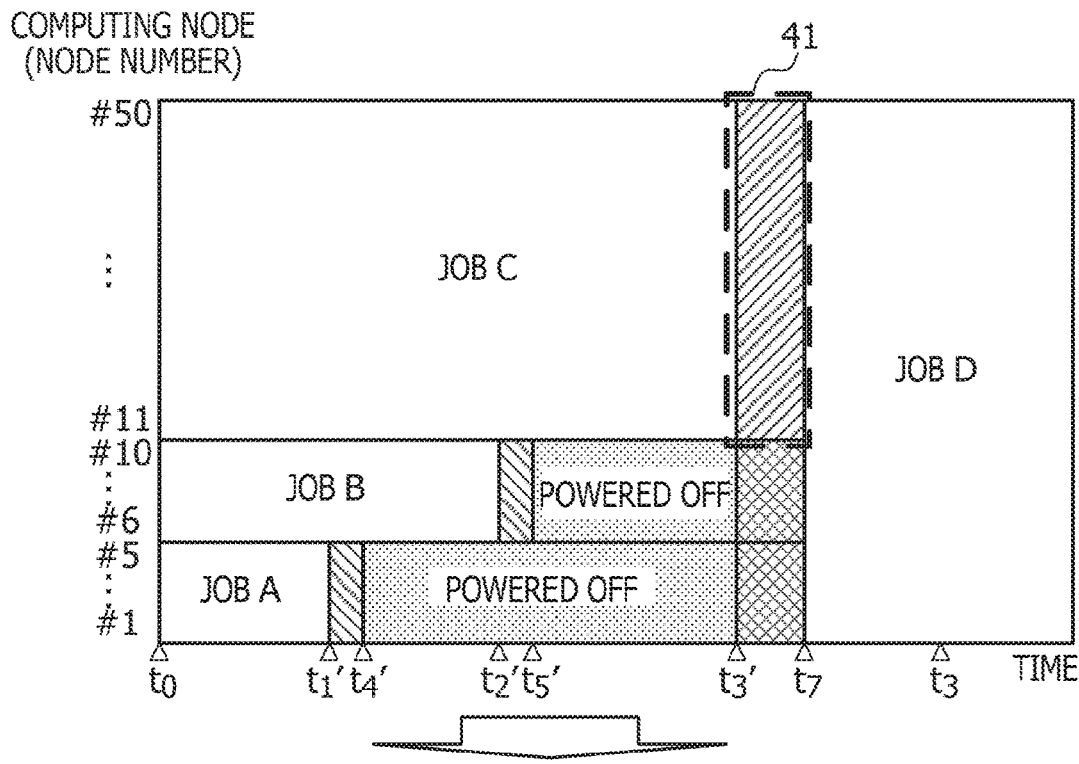
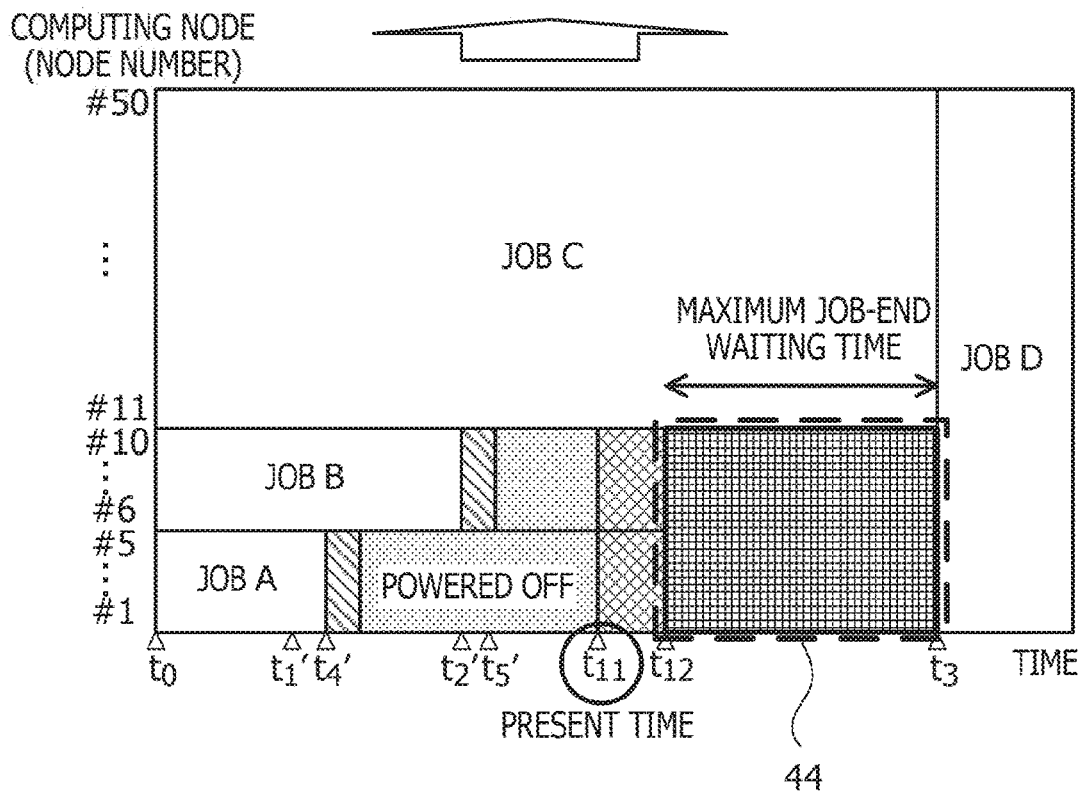

FIG.13

| NODE INFORMATION | | ACTIVE JOB | | NEXT JOB (SCHEDULED) | |
|---|---|---|---|---|---|
| NODE NUMBER | POWER SUPPLY STATE | JOB NAME | SCHEDULED END TIME | JOB NAME | SCHEDULED START TIME |
| #1 | OFF | - | - | D | 12:00 |
| ... | ... | ... | ... | ... | ... |
| #5 | OFF | - | - | D | 12:00 |
| #6 | ON | B | 11:00 | D | 12:00 |
| ... | ... | ... | ... | ... | ... |
| #10 | ON | B | 11:00 | D | 12:00 |
| #11 | ON | C | 12:00 | D | 12:00 |
| ... | ... | ... | ... | ... | ... |
| #50 | ON | C | 12:00 | D | 12:00 |

| NODE INFORMATION | | JOB EXECUTION INFORMATION | | | |
|---|---|---|---|---|---|
| | | ACTIVE JOB | | NEXT JOB (SCHEDULED) | |
| NODE NUMBER | POWER SUPPLY STATE | JOB NAME | SCHEDULED END TIME | JOB NAME | SCHEDULED START TIME |
| #1 | ON | - | - | D | 12:00 |
| ... | ... | ... | ... | ... | ... |
| #5 | ON | - | - | D | 12:00 |
| #6 | ON | - | - | D | 12:00 |
| ... | ... | ... | ... | ... | ... |
| #10 | ON | - | - | D | 12:00 |
| #11 | ON | C | 12:00 | D | 12:00 |
| ... | ... | ... | ... | ... | ... |
| #50 | ON | C | 12:00 | D | 12:00 |

| NODE INFORMATION | | JOB EXECUTION INFORMATION | | | | EVALUATED VALUE AND ACTUAL RESULT VALUE OF ENERGY LOSS | | |
|---|---|---|---|---|---|---|---|---|
| | | ACTIVE JOB | | NEXT JOB (SCHEDULED) | | | | |
| NODE NUMBER | POWER SUPPLY STATE | JOB NAME | SCHEDULED END TIME | JOB NAME | SCHEDULED START TIME | ACTUAL BOOT TIME | EVALUATED VALUE OF BOOT WAITING ENERGY LOSS | ASSUMED VALUE OF JOB-END WAITING ENERGY LOSS |
| #1 | OFF | - | - | D | 12:00 | | | |
| ⋮ | ⋮ | ⋮ | ⋮ | ⋮ | ⋮ | ⋮ | ⋮ | ⋮ |
| #5 | OFF | - | - | D | 12:00 | | | |
| #6 | ON | B | 11:00 | D | 12:00 | | | |
| ⋮ | ⋮ | ⋮ | ⋮ | ⋮ | ⋮ | ⋮ | ⋮ | ⋮ |
| #10 | ON | B | 11:00 | D | 12:00 | | | |
| #11 | ON | C | 12:00 | D | 12:00 | | | |
| ⋮ | ⋮ | ⋮ | ⋮ | ⋮ | ⋮ | ⋮ | ⋮ | ⋮ |
| #50 | ON | C | 12:00 | D | 12:00 | | | |

| NODE INFORMATION | | JOB EXECUTION INFORMATION | | | | EVALUATED VALUE AND ACTUAL RESULT VALUE OF ENERGY LOSS | | |
|---|---|---|---|---|---|---|---|---|
| | | ACTIVE JOB | | NEXT JOB (SCHEDULED) | | | | |
| NODE NUMBER | POWER SUPPLY STATE | JOB NAME | SCHEDULED END TIME | JOB NAME | SCHEDULED START TIME | ACTUAL BOOT TIME | EVALUATED VALUE OF BOOT WAITING ENERGY LOSS | ASSUMED VALUE OF JOB-END WAITING ENERGY LOSS |
| #1 | ON | - | - | D | 12:00 | 11:45 | 60000 W | |
| : | : | : | : | : | : | : | : | : |
| #5 | ON | - | - | D | 12:00 | 11:45 | 60000 W | |
| #6 | ON | - | - | D | 12:00 | 11:45 | 60000 W | |
| : | : | : | : | : | : | : | : | : |
| #10 | ON | - | - | D | 12:00 | 11:45 | 60000 W | |
| #11 | ON | C | 12:00 | D | 12:00 | - | 60000 W | |
| : | : | : | : | : | : | : | : | : |
| #50 | ON | C | 12:00 | D | 12:00 | - | 60000 W | |

FIG.24
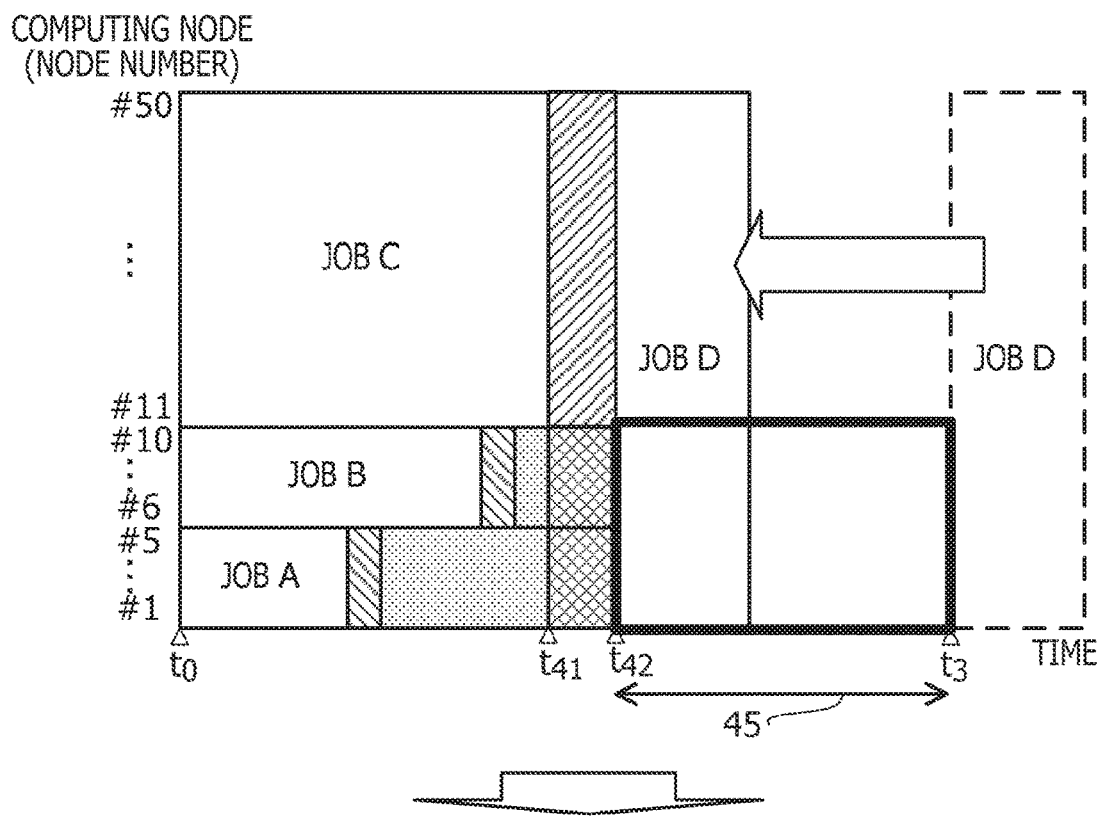
ASSUMED VALUE OF JOB-END WAITING ENERGY LOSS
= PROPER VALUE OF COEFFICIENT α × BOOT WAITING ENERGY LOSS
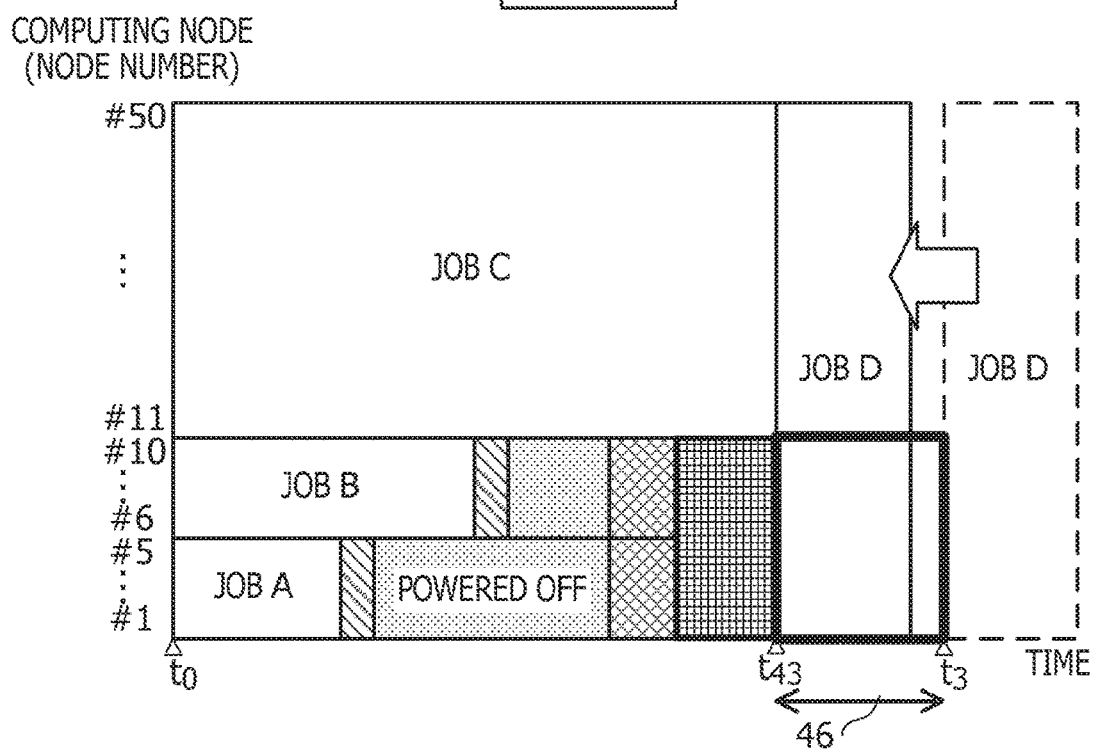

INFORMATION PROCESSING DEVICE AND METHOD OF CONTROLLING COMPUTERS

CROSS-REFERENCE TO RELATED APPLICATION

This application is based upon and claims the benefit of priority of the prior Japanese Patent Application No. 2017-240761, filed on Dec. 15, 2017, the entire contents of which are incorporated herein by reference.

FIELD

The embodiments discussed herein are related to an information processing device and a method of controlling computers.

BACKGROUND

A high-performance computer system such as a supercomputer or a large-scale personal computer (PC) cluster system is referred to as a high performance computing (HPC) system.

An HPC system of today has a plurality of computers coupled to each other via a high-speed communication network. The plurality of computers perform computation processing in parallel with each other. Each of the computers performing the computation processing is referred to as a computing node. A user of the HPC system inputs a request to execute a job to be executed by the HPC system to a job scheduler provided within the HPC system. The job is a unit of computation processing to be executed by the HPC system. When inputting the request to execute the job, the user specifies a number of computing nodes to be used and a scheduled usage length as computing resources to be used for execution of the job.

For a plurality of jobs received by the job scheduler, execution order and computing nodes to be used are determined in accordance with a policy such as first come first served (FCFS), and the jobs are sequentially executed by the determined computing nodes. The amount of computing resources used for each job may be arbitrarily specified by the user. The numbers of computing nodes to be used for execution of the jobs and scheduled usage lengths are thus both non-uniform. Therefore, until a number of computing nodes to be used for execution of a job to be executed next become available, computing nodes that become available earlier wait in a state of not executing any job. As a result, there occur computing nodes in a state of not being used for execution of any job within the HPC system. A computing node in a state of not being used for execution of any job will hereinafter be referred to as a free computing node.

Even a free computing node consumes power as long as power of the free computing node is on. This means that needless power consumption (power loss) being not used for job execution occurs when the free computing node is present for a long period.

Related techniques of reducing an energy consumed wastefully (energy loss) include a technology of causing free computing nodes to be powered off. For example, free computing nodes already prepared are powered off until a number of free computing nodes to be used for execution of a job scheduled to be executed next are prepared. The powered-off computing nodes are powered on to boot at a time point that the number of free computing nodes to be used are prepared. In this case, a computing node that becomes a free computing node last waits until completion of boot of the other free computing nodes. In a time of this boot waiting, the computing node that becomes a free computing node last consumes needless power without executing any job, thus causing a power loss. In the present example, even though the occurrence of a power loss due to a wait for an end of another job is suppressed by powering off free computing nodes, a power loss due to boot waiting occurs.

The power-on of the powered-off computing nodes may be moved up. If the execution of each job takes, to be ended, just a scheduled usage length specified by the user, for example, an end time of each job may be predicted accurately. In this case, when the powered-off free computing nodes are powered on to coincide with the end time of a job, the occurrence of a power loss due to boot waiting may be avoided.

Related techniques for reducing an energy loss include, for example, a technique in which, while suppressing power consumption of the whole of a computer system by switching a host computer to a powered-off state, the computer system achieves an improvement in performance of the whole of the computer system by suppressing a waiting time until the powered-off host computer becomes available. The related techniques also include a technique in which a cluster system operates a plurality of nodes as one cluster and may achieve a power saving of the whole of the cluster by saving power to a node in an idle state.

Related techniques are disclosed in, for example, Japanese Laid-open Patent Publication No. 2008-225639 and Japanese Laid-open Patent Publication No. 2003-162515.

Reducing an energy loss by powering on a powered-off free computing node to coincide with the end time of a job is effective in a case where the end time of each job is predicted accurately. In actuality, however, the user estimates the scheduled usage length to be longer in order to make the job completed certainly within the scheduled usage length, and thus an actual execution time of the job may be shorter than the scheduled usage length. Then, it is difficult to accurately predict an amount of time actually taken to execute the job. Therefore, it is difficult to determine appropriate power-on timing of the powered-off computing node, and it is difficult to sufficiently reduce energy consumption of a computing node that is not executing any job.

Such problems are not unique to the HPC system but common to systems that execute jobs by using a plurality of computers.

SUMMARY

According to an aspect of the present invention, provided is an information processing device including a memory and a processor coupled to the memory. The processor is configured to calculate a first energy consumption of a first computer. The first energy consumption is energy to be consumed during a boot latency when the first computer has already booted and is in a state of not executing any job. The boot latency is a length of time taken for boot of a second computer scheduled to execute a second job together with the first computer after an end of a first job executed by the first computer. The processor is configured to calculate a second energy consumption of the second computer. The second energy consumption is energy to be consumed during a waiting time when the second computer has already booted and is in a state of not executing any job. The waiting time is obtained by subtracting the boot latency from a time difference between a scheduled end time stored in the memory and a present time. The scheduled end time is a time point at which the first job is scheduled to be ended. The processor is configured to perform power-on control of powering on the second computer when power of the second computer is off and when the second energy consumption becomes equal to or less than a threshold value determined based on the first energy consumption.

The object and advantages of the invention will be realized and attained by mean of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of determining a boot start time of a powered-off computing node;

FIG. 13 is a diagram illustrating an example of a node usage schedule table;

FIG. 14 is a diagram illustrating an example of a node usage schedule table after an update;

FIG. 22 is a diagram illustrating an example of a node usage schedule table extended for recording an actual result of an energy loss;

FIG. 23 is a diagram illustrating an example of a node usage schedule table in which an evaluated value of a boot waiting energy loss and an actual boot start time are set;

FIG. 24 is a diagram illustrating an example of calculating an assumed value of a job-end waiting energy loss.

DESCRIPTION OF EMBODIMENTS

Embodiments will hereinafter be described with reference to the drawings. It is to be noted that any of the embodiments may be combined with each other and carried out within a scope where no inconsistency arises.

First Embodiment

A first embodiment will be described. The first embodiment reduces energy consumption of the whole of a system by reducing energy consumption occurring due to waiting between computers. The waiting accompanies power-on and boot of a computer that has been powered off in a state of not executing any job.

Figure 1:
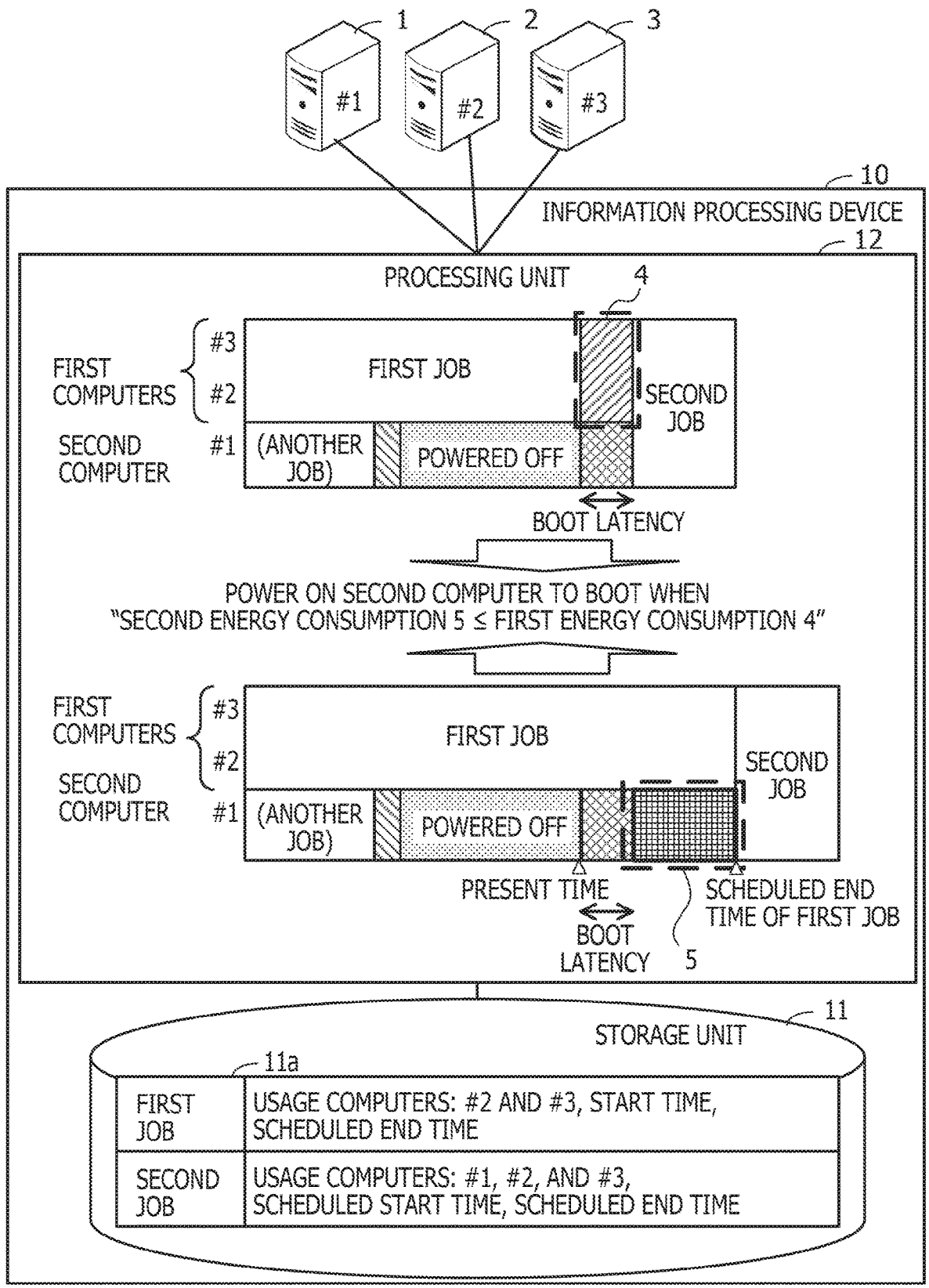
FIG. 1 is a diagram illustrating an exemplary configuration of a system according to a first embodiment.

FIG. 1 is a diagram illustrating an exemplary configuration of a system according to the first embodiment. An information processing device 10 is coupled to a plurality of computers 1, 2, and 3. Each of the plurality of computers 1, 2, and 3 is, for example, a computer including a processor and a memory. An identification number is given to each of the plurality of computers 1, 2, and 3. The identification number of the computer 1 is "#1". The identification number of the computer 2 is "#2". The identification number of the computer 3 is "#3". The information processing device 10 makes the computers 1, 2, and 3 execute jobs, and controls power-off and power-on of the computers 1, 2, and 3.

The information processing device 10 includes a storage unit 11 and a processing unit 12 to control the computers 1, 2, and 3. The storage unit 11 is, for example, a memory or a storage device possessed by the information processing device 10. The processing unit 12 is, for example, a processor or an arithmetic circuit possessed by the information processing device 10.

The storage unit 11 stores job schedule information 11a therein. An execution schedule of jobs executed by the computers 1, 2, and 3 is set in the job schedule information 11a. For example, as for a job already started to be executed, set in the job schedule information 11a are the identification numbers of computers used to execute the job, a time (start time) of a start of execution of the job, and a time (scheduled end time) at which the execution of the job is scheduled to be ended. As for a job not started to be executed yet, set in the job schedule information 11a are the identification numbers of computers used to execute the job, a time (scheduled start time) at which execution of the job is scheduled to be started, and a scheduled end time. In the example of FIG. 1, the job schedule information 11a indicates that a first job is being executed, and that after an end of the execution of the first job, a second job is to be executed by using computers used for the first job.

The processing unit 12 requests the computers 1, 2, and 3 to execute a job in accordance with a schedule included in the job schedule information 11a stored in the storage unit 11. In addition, the processing unit 12 performs power supply control of the computers 1, 2, and 3 as follows. The power supply control includes power-off control and power-on control. In the following, the computers 2 and 3 that are executing the first job will be referred to as first computers, and the computer 1 that is to execute the second job together with the first computers after the end of the first job will be referred to as a second computer.

The power-off control will be described. The processing unit 12 determines whether or not to perform the power-off control when the second computer (the computer 1) has already booted and is in a state of not executing any job. For example, the processing unit 12 determines whether a time difference between the scheduled end time of the first job and a present time is larger than a sum of a shutdown latency taken for shutdown of the second computer (the computer 1) and a boot latency taken for boot of the second computer (the computer 1). The processing unit 12 performs the power-off control of the second computer (the computer 1) when the time difference is larger. For example, the processing unit 12 transmits a power-off instruction to the second computer (the computer 1). Upon receiving the power-off instruction, the second computer (the computer 1) performs the shutdown, and performs a power-off process after completion of the shutdown. Performing the power-off process is, for example, electronically turning off a power switch. The second computer (the computer 1) stops a main power supply. Even while the main power supply is stopped, power is continuously supplied to a circuit that receives a power-on instruction from the information processing device 10 and performs a power-on process in response to the power-on instruction.

Power consumption may be reduced by thus powering off a computer that is not executing any job. The power-off control of the power to the second computer (the computer 1) by the processing unit 12 is performed only before the second computer (the computer 1) is powered on by the power-on control. After the second computer (the computer 1) is powered on by the power-on control, the processing unit 12 does not perform the power-off control of the power to the second computer (the computer 1) even when the condition for the power-off is satisfied.

The power-on control will be described. The processing unit 12 calculates a first energy consumption 4 consumed by the first computers (the computers 2 and 3) during a boot latency of the second computer (the computer 1). The first energy consumption 4 is calculated based on power consumed by the first computers (the computers 2 and 3) in a case where the first computers (the computers 2 and 3) have already booted and are in a state of not executing any job.

The processing unit 12 calculates a second energy consumption 5 consumed by the second computer (the computer 1) during a waiting time obtained by subtracting the boot latency of the second computer (the computer 1) from the time difference between the scheduled end time of the first job and the present time. The second energy consumption 5 is calculated based on power consumed by the second computer (the computer 1) in a case where the second computer (the computer 1) has already booted and is in a state of not executing any job.

When the second computer (the computer 1) is in a powered-off state, and the second energy consumption 5 becomes equal to or less than a threshold value determined based on the first energy consumption 4, the processing unit 12 performs the power-on control to power on the second computer (the computer 1). The threshold value is, for example, a value obtained by multiplying the first energy consumption 4 by a coefficient equal to or more than zero. When the value of the coefficient is "1", the first energy consumption 4 is the threshold value.

In the power-on control, the processing unit 12, for example, transmits a power-on instruction to the second computer (the computer 1). Upon receiving the power-on instruction, the second computer (the computer 1) performs a power-on process. Performing the power-on process is, for example, electronically turning on the power switch. The powered-on second computer (the computer 1) performs the boot.

The processing unit 12 transmits a power-on instruction to the second computer (the computer 1) also when the execution of the first job is ended before the processing unit 12 transmits the power-on instruction to the second computer (the computer 1).

After the boot of the second computer (the computer 1) is completed, the processing unit 12 instructs the first computers (the computers 2 and 3) and the second computer (the computer 1) to execute the second job. For example, when the execution of the first job is already ended at a time point of completion of the boot of the second computer (the computer 1), the processing unit 12 immediately gives an instruction to execute the second job. When the execution of the first job is not yet ended at the time point of completion of the boot of the second computer (the computer 1), the processing unit 12 waits for the execution of the first job to be ended. Thereafter, when the execution of the first job is ended, the processing unit 12 gives an instruction to execute the second job.

Thus, in the first embodiment, the second computer (the computer 1) is powered on to boot without waiting for the scheduled end time of the first job. This suppresses occurrence of waiting of the first computers (the computers 2 and 3) for boot of the second computer (the computer 1). For example, power consumption caused by waiting for boot of the second computer (the computer 1) is suppressed.

Here, the quicker the power-on of the second computer (the computer 1), the longer the time of waiting for an end of the first job in the second computer (the computer 1). Accordingly, the processing unit 12, for example, waits for the second energy consumption 5 to become equal to or less than the first energy consumption 4, and cause the second computer (the computer 1) to power on. In this case, needless energy consumption due to a wait for an end of the first job is the first energy consumption 4 at a maximum. The needless energy consumption due to a wait for an end of the first job is maximized in a case where the first job is executed until the scheduled end time. When the first job is ended after completion of boot of the second computer (the computer 1) and before the scheduled end time, the needless energy consumption due to a wait for an end of the first job is smaller than the first energy consumption 4. The scheduled execution length of a job may be set longer than a time actually taken for the execution of the job. Thus, in most cases, the needless energy consumption due to a wait for an end of the first job is smaller than the first energy consumption 4. Therefore, energy consumption is reduced.

When the processing unit 12 determines the threshold value using the coefficient, the processing unit 12 may also optimize the value of the coefficient based on an end time of the first job. For example, the processing unit 12 calculates a third energy consumption consumed by the second computer (the computer 1) in a case where it is assumed that the second computer (the computer 1) has already booted and is in a state of not executing any job for a time period from the end time of the first job to the scheduled end time of the first job. The processing unit 12 then updates the value of the coefficient based on a value (proper value of the coefficient) obtained by dividing the third energy consumption by the first energy consumption 4. For example, when a large number of jobs are executed, the processing unit 12 calculates the proper value of the coefficient at the time of execution of each job. The processing unit 12 then updates the value of the coefficient to a representative value (for example, an average value) of a plurality of proper values. Thus optimizing the value of the coefficient may further reduce power consumption.

Second Embodiment

A second embodiment will next be described. The second embodiment reduces power consumption in an HPC system.

The HPC system is widely used for scientific calculation and industrial applications. The higher the performance of the HPC system, the shorter a time in which the HPC system performs complex calculation. Therefore, a higher-performance HPC system is desired, and the system scale of the HPC system continues to be increasing. An increase in the system scale also increases power consumption of the system. Reducing the power consumption of the HPC system, whose power consumption has a tendency to thus increase, is important in operating the HPC system.

Accordingly, the second embodiment reduces an energy (energy loss) consumed by a free computing node being not used for job execution, by appropriately controlling power-off and power-on of the free computing node. The second embodiment thereby reduces power consumption of the entire HPC system.

Figure 2:
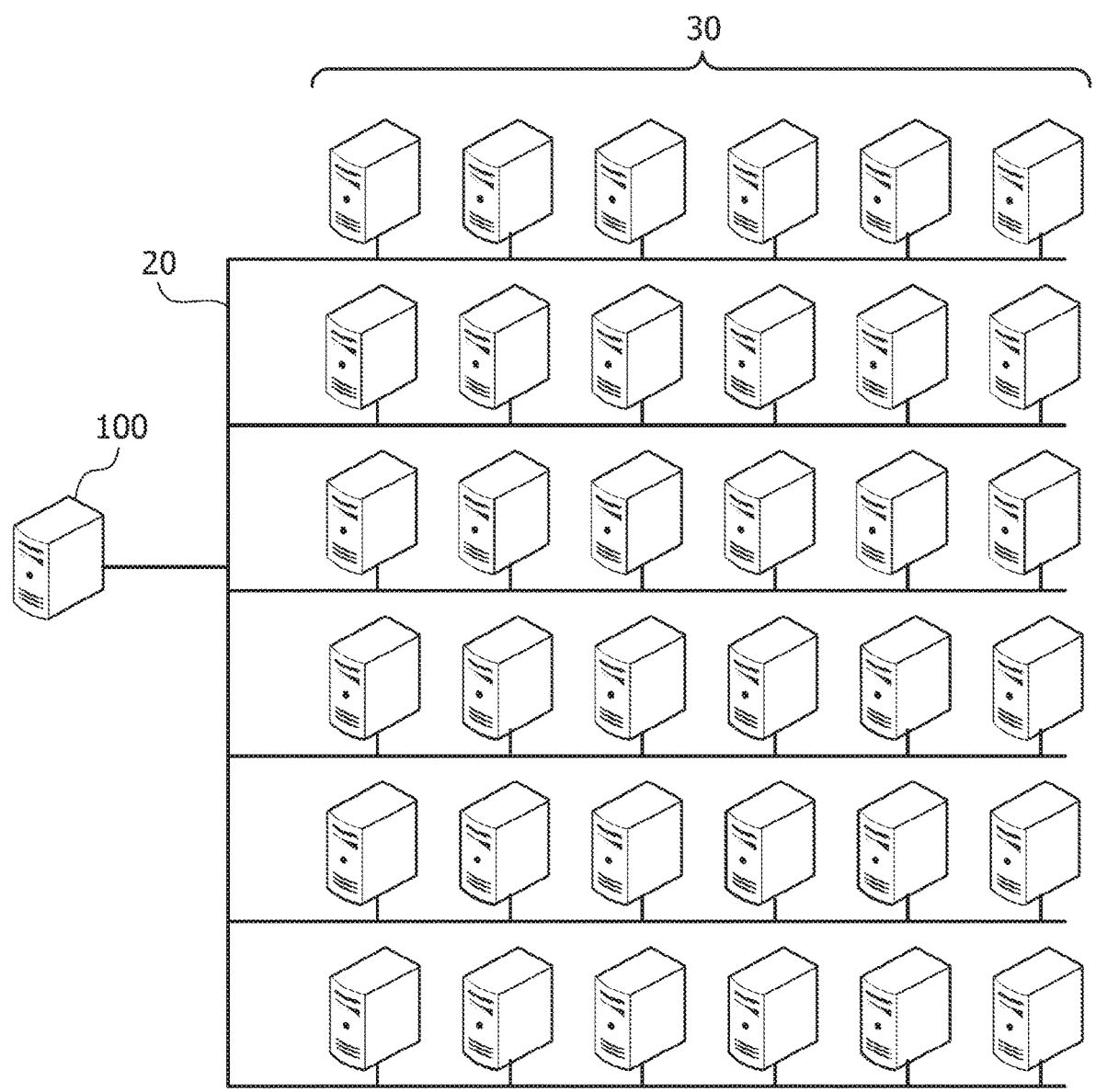
FIG. 2 is a diagram illustrating an exemplary configuration of an HPC system according to a second embodiment.

FIG. 2 is a diagram illustrating an exemplary configuration of an HPC system according to the second embodiment. The HPC system includes a computing node group 30 and a control node 100 coupled to the computing node group 30 via a control network 20.

The computing node group 30 includes a plurality of computing nodes. The computing nodes are computers performing calculation in the HPC system. Coupling between the computing nodes included in the computing node group 30 is established by a network such as a multidimensional mesh, a torus, or a fat tree.

The control node 100 is a computer that requests computing nodes within the computing node group 30 to execute a job via the control network 20. In response to the job execution request, each of the computing nodes executes the job indicated in the execution request.

In addition, the control node 100 controls power to each computing node to reduce power consumption of the entire HPC system. Power consumption of computing nodes executing a job is effectively used for execution of the job, and is thus not set as a target of power supply control for a reduction in power consumption. On the other hand, power consumption of free computing nodes that are not executing any job is not effectively used for job execution, and is thus set as a target of power supply control for a reduction in power consumption.

As illustrated in FIG. 2, in a case where a plurality of computing nodes are coupled by a mesh coupling or a torus coupling, data communicated between the computing nodes is handed over between computing nodes adjacent to each other, and is transferred to a destination computing node. That is, the computing nodes also serve as data relay devices. In such a case, when each computing node receives a shutdown instruction, the computing node stops only functions not related to a data relaying function. Thus, even when a part of the computing nodes shut down, data transmission within the HPC system may be continued without any hindrance.

Figure 3:
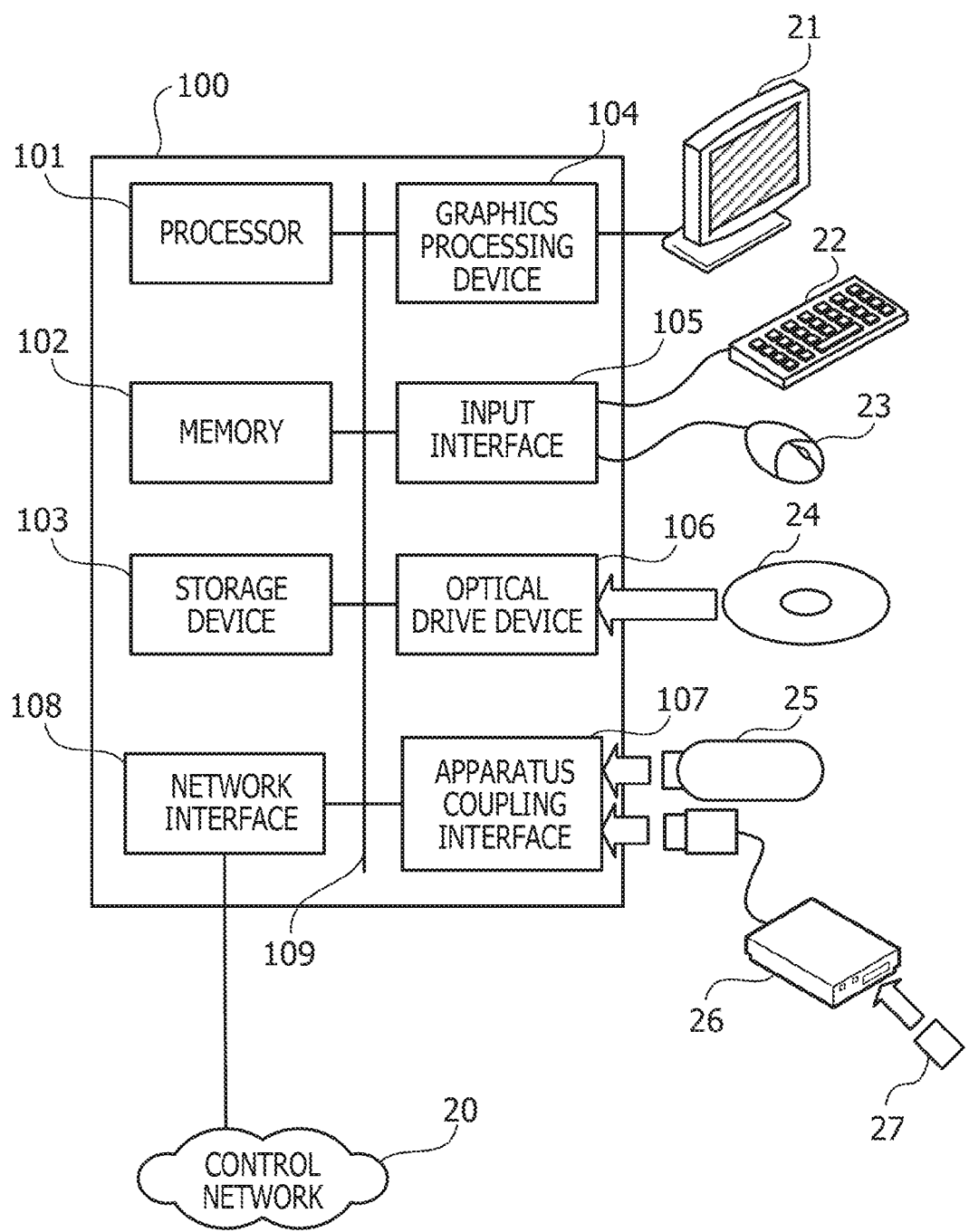
FIG. 3 is a diagram illustrating an exemplary hardware configuration of a control node.

FIG. 3 is a diagram illustrating an exemplary hardware configuration of the control node. The entire device of the control node 100 is controlled by a processor 101. The processor 101 is coupled to a memory 102 and a plurality of peripheral devices via a bus 109. The processor 101 may be a multiprocessor. The processor 101 is, for example, a central processing unit (CPU), a micro processing unit (MPU), or a digital signal processor (DSP). At least a part of functions implemented when the processor 101 executes a program may be implemented by an electronic circuit such as an application specific integrated circuit (ASIC) or a programmable logic device (PLD).

The memory 102 is used as a main memory of the control node 100. The memory 102 temporarily stores at least a part of an operating system (OS) program and an application program executed by the processor 101. The memory 102 also stores various kinds of data used for processing by the processor 101. A volatile semiconductor memory such as a random access memory (RAM) or the like is used as the memory 102.

The peripheral devices coupled to the bus 109 include a storage device 103, a graphics processing device 104, an input interface 105, an optical drive device 106, an apparatus coupling interface 107, and a network interface 108.

The storage device 103 electrically or magnetically writes and reads data on an internal recording medium. The storage device 103 is used as an auxiliary memory of a computer. The storage device 103 stores the OS program, the application program, and various kinds of data. For example, a hard disk drive (HDD) or a solid state drive (SSD) may be used as the storage device 103.

The graphics processing device 104 is coupled to a monitor 21. The graphics processing device 104 displays an image on a screen of the monitor 21 in accordance with an instruction from the processor 101. The monitor 21 includes display devices using organic electro luminescence (EL), liquid crystal display devices, and the like.

The input interface 105 is coupled to a keyboard 22 and a mouse 23. The input interface 105 transmits signals sent from the keyboard 22 and the mouse 23 to the processor 101. The mouse 23 is an example of a pointing device, and other pointing devices may also be used. The other pointing devices include a touch panel, a tablet, a touch pad, a trackball, and the like.

The optical drive device 106 reads data recorded on an optical disk 24 by using laser light or the like. The optical disk 24 is a portable recording medium on which data is recorded so as to be readable by reflection of light. The optical disk 24 includes a digital versatile disc (DVD), a DVD-RAM, a compact disc read-only memory (CD-ROM), a CD-recordable/rewritable (CD-R/RW), and the like.

The apparatus coupling interface 107 is a communication interface for coupling peripheral devices to the control node 100. The apparatus coupling interface 107 may, for example, be coupled to a memory device 25 and a memory reader-writer 26. The memory device 25 is a recording medium having a function of communicating with the apparatus coupling interface 107. The memory reader-writer 26 is a device that writes data to a memory card 27 or read data from the memory card 27. The memory card 27 is a card type recording medium.

The network interface 108 is coupled to the control network 20. The network interface 108 transmits and receives data to and from another computer or communication device via the control network 20.

The hardware configuration as described above may implement processing functions of the second embodiment. The information processing device 10 according to the first embodiment may also be implemented by hardware similar to that of the control node 100 illustrated in FIG. 3.

The control node 100 implements the processing functions of the second embodiment by executing a program recorded on a computer-readable recording medium, for example. The program describing processing contents to be executed by the control node 100 may be recorded on various recording media. For example, the program to be executed by the control node 100 may be stored in the storage device 103. The processor 101 loads at least a part of the program within the storage device 103 into the memory 102, and executes the program. The program to be executed by the control node 100 may also be recorded on a portable recording medium such as the optical disk 24, the memory device 25, or the memory card 27. The program stored on the portable recording medium becomes executable after being installed into the storage device 103 under control of the processor 101, for example. The processor 101 may also read the program directly from the portable recording medium and execute the program.

Description will be made of functions possessed by the control node 100.

Figure 4:
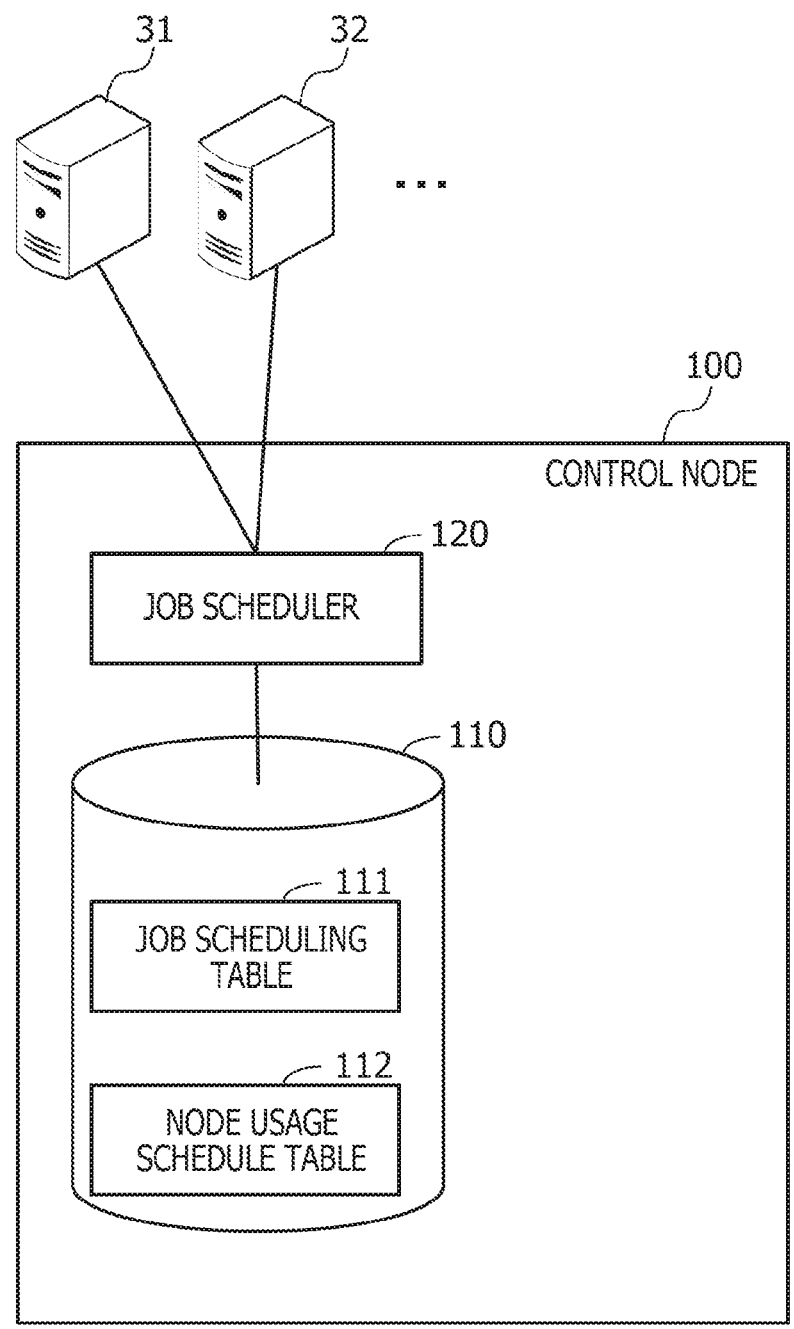
FIG. 4 is a diagram illustrating an exemplary functional configuration of a control node.

FIG. 4 is a diagram illustrating an exemplary functional configuration of the control node. The control node 100 includes a job schedule storage unit 110 and a job scheduler 120. The job schedule storage unit 110 and the job scheduler 120 may be implemented by making the control node 100 execute program modules corresponding to the job schedule storage unit 110 and the job scheduler 120, respectively, for example.

The job schedule storage unit 110 stores information on an execution schedule of jobs. For example, the job schedule storage unit 110 stores a job scheduling table 111 and a node usage schedule table 112. A job execution schedule is set in the job scheduling table 111. States of the computing nodes, a result of evaluation of power losses, and the like are set in the node usage schedule table 112.

The job scheduler 120 schedules jobs to be executed. The job scheduler 120, for example, receives an instruction to execute a job from a user. The instruction to execute the job, for example, includes information on computing resources to be used for execution of the job. The information on the computing resources includes the number of computing nodes to be used and a scheduled usage length for the job. When the job scheduler 120 receives instructions to execute jobs from a plurality of users, respectively, the job scheduler 120 determines the respective orders of the jobs and computing resources to be assigned for executing the respective jobs. Information on the determined computing resources includes one or more computing nodes to be used for execution of a job, a scheduled execution start time of the job, and a scheduled execution end time of the job. The job scheduler 120 sets information in the job scheduling table 111 based on the information on the determined computing resources. Then, the job scheduler 120 transmits a job execution request to computing nodes 31, 32, . . . in accordance with the job execution schedule included in the job scheduling table 111.

Further, the job scheduler 120 refers to the job scheduling table 111, and controls power to the computing nodes 31, 32, . . . to reduce the power consumption of the HPC system. For example, the job scheduler 120 causes the computing nodes that are not executing any job to stop operations and to perform a power-off process. The job scheduler 120 then determines a boot start time of the powered-off computing nodes based on the job execution schedule included in the job scheduling table 111 so as to achieve a reduction in power consumption. At this time, the job scheduler 120 determines the boot start time of the computing nodes so as to minimize an assumed energy loss by using the node usage schedule table 112.

Figure 5:
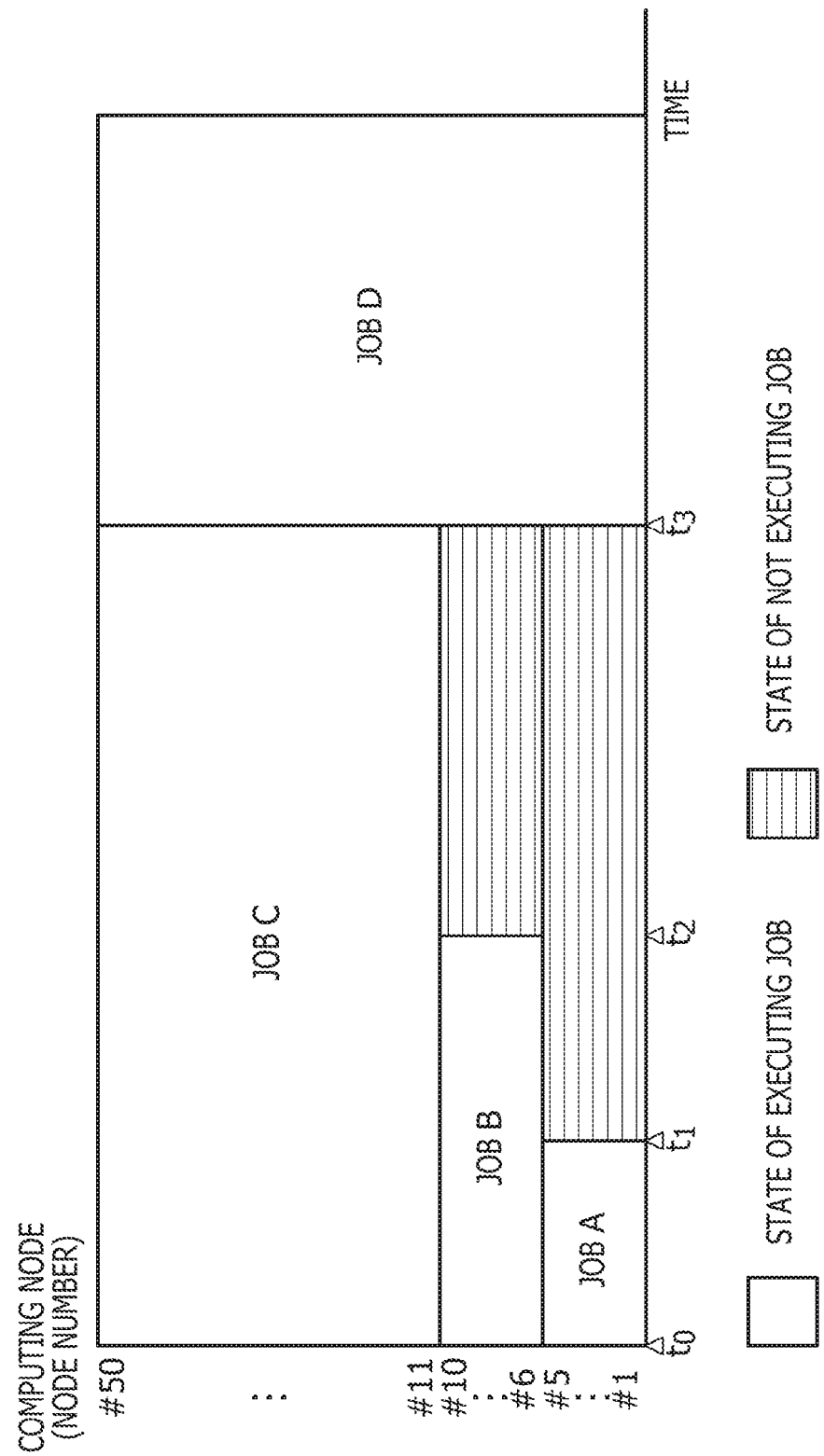
FIG. 5 is a diagram illustrating an example of a job schedule.

FIG. 5 is a diagram illustrating an example of a job schedule. The horizontal axis indicates time, and the vertical axis indicates computing nodes. In the example of FIG. 5, three jobs A, B, and C are executed at a present time to. Five computing nodes having node numbers "#1" to "#5" are used for execution of the job A. Five computing nodes having node numbers "#6" to "#10" are used for execution of the job B. Forty computing nodes having node numbers "#11" to "#50" are used for execution of the job C. A larger scale job D is scheduled to be executed after these jobs A, B, and C. The job D is executed by fifty computing nodes having the node numbers "#1" to "#50". The job D is therefore executed after an end of the three preceding jobs A, B, and C.

The scheduled end time of the job A is time $t_1$. The scheduled end time of the job B is time $t_2$, which is later than time $t_1$. The scheduled end time of the job C is time $t_3$, which is later than time $t_2$. In this case, the scheduled start time of the job D is time $t_3$. As a result, the computing nodes having the node numbers "#1" to "#5" are in a state of not executing any job in a period from time $t_1$ to $t_3$. The computing nodes having the node numbers "#6" to "#10" are in a state of not executing any job in a period from time $t_2$ to $t_3$.

The computing nodes in a state of not executing any job also continue to consume power in a state in which a system such as an OS is operating. Accordingly, the job scheduler 120 reduces power consumption by powering off the computing nodes in a state of not executing any job. The job scheduler 120 reduces a power loss by shutdown and power-off of the computing nodes in a state of not executing any job and power-on and boot of the computing nodes in appropriate timing.

Boot or shutdown of a computing node takes a certain time. Therefore, when power supply control of a computing node in a state of not executing any job is performed in an unplanned manner, an opportunity to execute a job in the computing node may be lost and availability of the computing node may be decreased. Accordingly, the job scheduler 120 suppresses a start of execution of the jobs A, B, and C behind schedule by performing power supply control based on the job schedule information. For example, in the case where the computing nodes having the node numbers "#1" to "#10" are powered off after an end of the execution of the jobs A and B, the job scheduler 120 performs control such that boot of the powered-off computing nodes is completed at least at the scheduled end time (time $t_3$) of the job C. This suppresses a decrease in availability of the HPC system. The second embodiment may minimize an assumed power loss of the computing nodes in a state of not executing any job without greatly affecting the availability of the HPC system.

Figure 6:
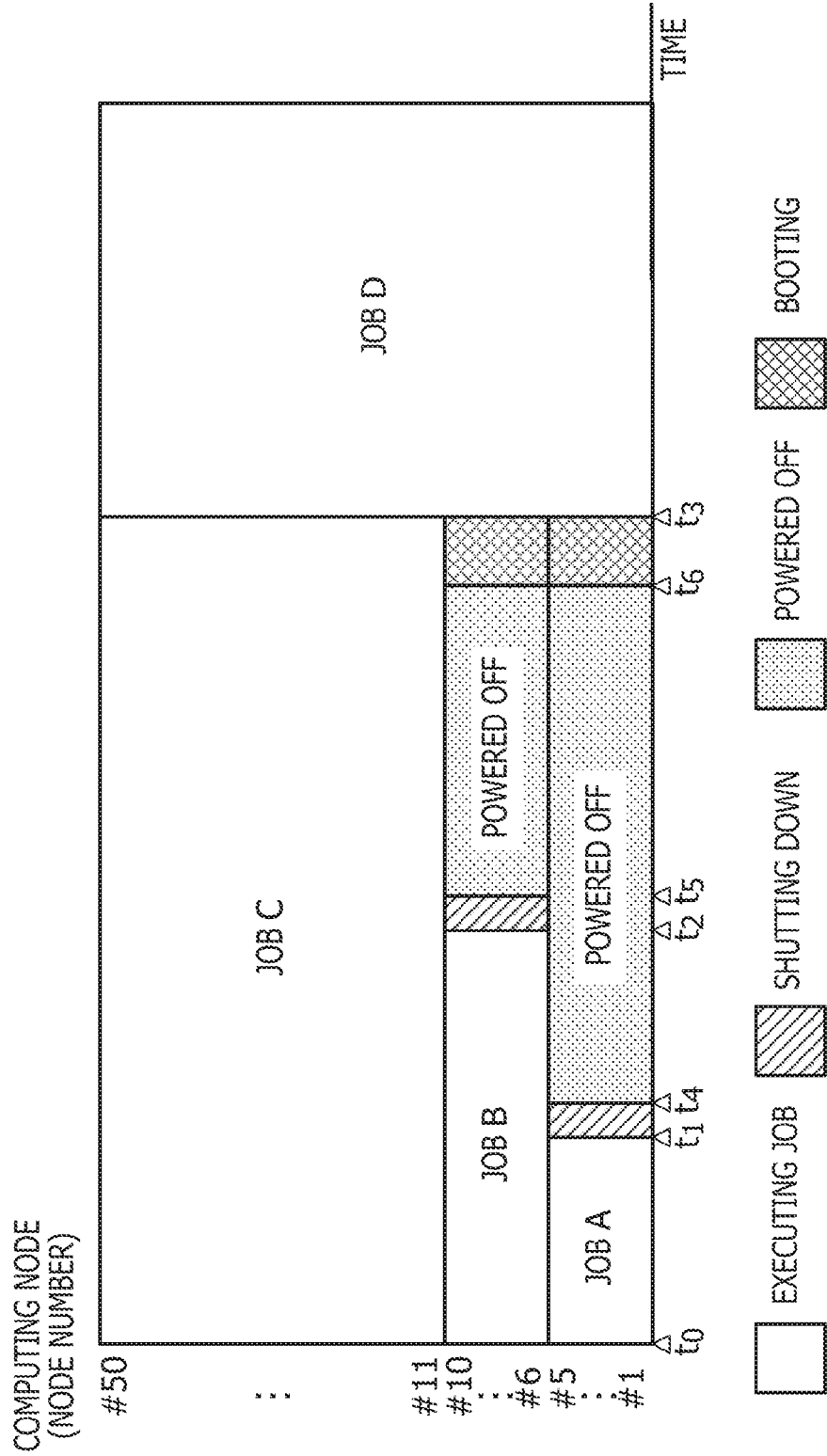
FIG. 6 is a diagram illustrating an example of a reduction in power consumption when jobs are executed on a job schedule.

FIG. 6 is a diagram illustrating an example of a reduction in power consumption when jobs are executed in conformity with a job schedule. The computing nodes having the node numbers "#1" to "#5" complete the execution of the job A at time $t_1$, start shutdown, and complete the shutdown at time $t_4$. The computing nodes having the node numbers "#1" to "#5" are powered off immediately after the completion of the shutdown. The computing nodes having the node numbers "#6" to "#10" complete the execution of the job B at time $t_2$, start shutdown, and complete the shutdown at time $t_5$. The computing nodes having the node numbers "#6" to "#10" are powered off immediately after the completion of the shutdown.

Then, at time $t_6$, which precedes time $t_3$ as the scheduled end time of the job C by a time taken for the boot of the computing node, the computing nodes having the node numbers "#1" to "#10" is powered on, and boot of these computing nodes is started. Then, the computing nodes having the node numbers "#1" to "#10" are able to execute a job at time $t_3$. When the execution of the job C is ended at time $t_3$, the computing nodes having the node numbers "#1" to "#50" immediately start to execute the job D.

In this case, the computing nodes having the node numbers "#1" to "#5" are in a powered-off state and thus hardly consume power in a period from time $t_4$ to time $t_6$. The computing nodes having the node numbers "#6" to "#10" are in a powered-off state and thus hardly consume power in a period from time $t_5$ to time $t_6$. Even in the powered-off state, the computing nodes consume a slight standby power. However, the standby power is at a negligible level as compared with power consumption in a case where the computing nodes in a state of not executing any job are operated.

When the jobs are executed in conformity with the job schedule as illustrated in FIG. 6, power consumption may be reduced sufficiently by powering off the computing nodes in a state of not executing any job. Moreover, the job scheduler 120 has, as the job scheduling table, information indicating the execution of the job D after the end of the job C. Therefore, the job scheduler 120 may power on the powered-off computing nodes to start boot at time $t_6$ preceding the end time of the job C by a certain time (time taken for the boot). This may suppress delaying of a start of execution of the job D from the scheduled start time due to the power-off control.

The scheduled end time of a job managed by the job scheduler 120 is determined based on a scheduled usage length specified by the user. In order to make desired computation processing certainly completed, the user specifies, as the scheduled usage length, a time obtained by adding an additional margin to an assumed maximum job execution time. As a result, most jobs are ended in shorter times than the scheduled usage lengths of the jobs. In a case where a job to be executed next is a large-scale job, already operating computing nodes wait in a state of not executing any job until completion of boot of computing nodes that have been powered off. Thus, needless power consumption (boot waiting power loss) occurs during this boot waiting.

Figure 7:
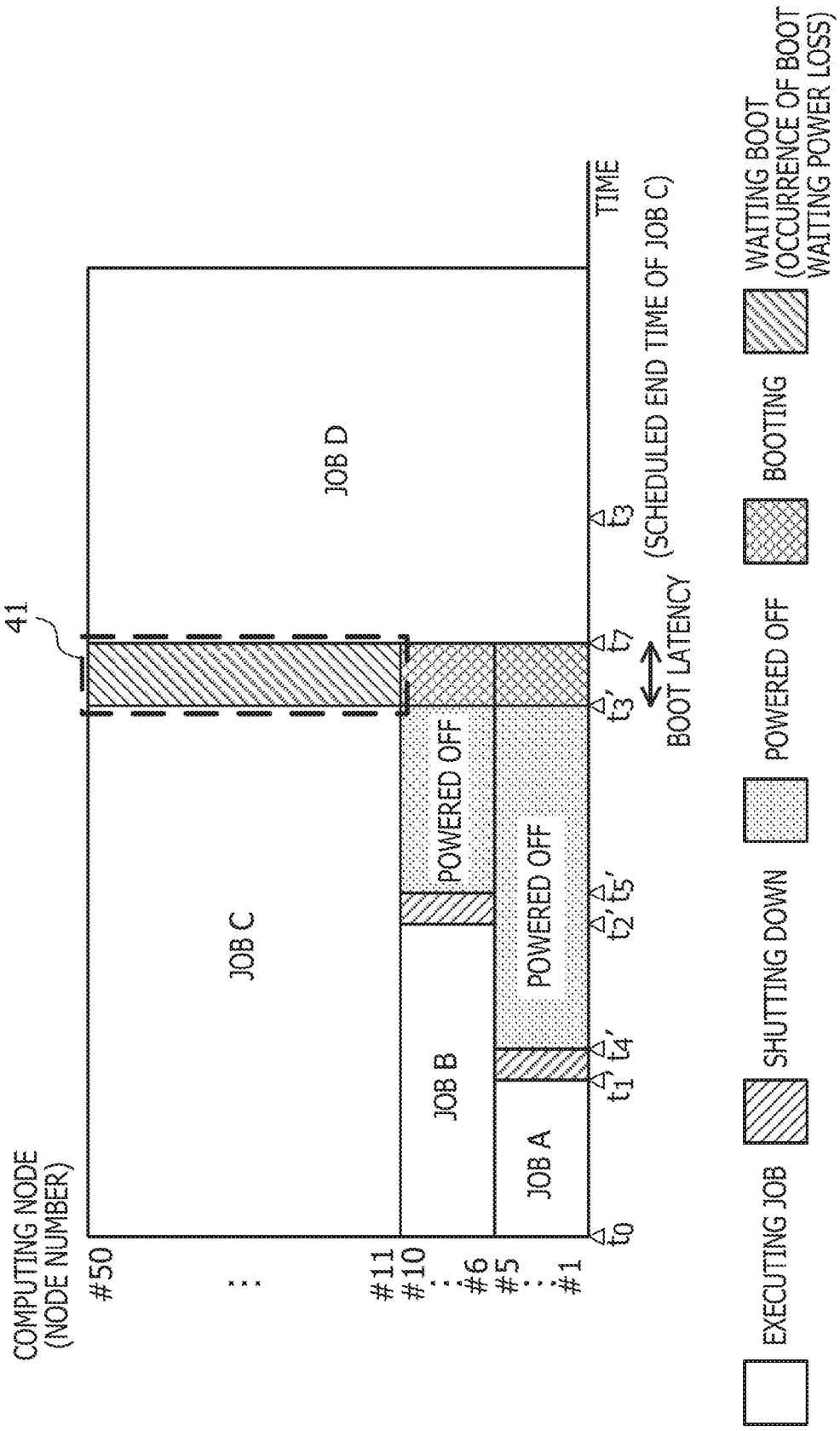
FIG. 7 is a diagram illustrating an example of occurrence of a boot waiting power loss.

FIG. 7 is a diagram illustrating an example of occurrence of a boot waiting power loss. In the example of FIG. 7, the executions of the jobs A, B, and C executed before the job D are ended at times earlier than the respective scheduled end times. The job A is ended at time $t_1'$ ($t_1'<t_1$). The computing nodes having the node numbers "#1" to "#5", which have executed the job A, start to shut down at time $t_1'$, and the computing nodes having the node numbers "#1" to "#5" are powered off at time $t_4'$. The job B is ended at time $t_2'$ ($t_2'<t_2$). The computing nodes having the node numbers "#6" to "#10", which have executed the job B, start to shut down at time $t_2'$, and the computing nodes having the node numbers "#6" to "#10" are powered off at time $t_5'$. The job C is ended at time $t_3'$ ($t_3'<t_3$).

If the computing nodes having the node numbers "#1" to "#10" are not in a state of powered off when the execution of the job C is ended, the execution of the job D may be started at time $t_3'$. However, in the case where the computing nodes having the node numbers "#1" to "#10" in a state of not executing any job are powered off to reduce power consumption, as illustrated in FIG. 7, boot of the computing nodes having the node numbers "#1" to "#10" is started at time $t_3'$. Then, the computing nodes having the node numbers "#11" to "#50", which have executed the job C, wait in a state of not executing any job until time $t_7$ at which the boot of the computing nodes having the node numbers "#1" to "#10" is completed. The state of the computing nodes thus waiting in a state of not executing any job for other computing nodes to boot will be referred to as a state of waiting boot (boot waiting state).

The computing nodes in the boot waiting state consume power while waiting for completion of the boot of the other computing nodes. The power consumed at this time is a boot waiting power loss. A value obtained by integrating the boot waiting power loss with respect to time is a boot waiting energy loss 41. The boot waiting energy loss 41 is a value resulting from multiplying power consumption per computing node in a state of not executing any job by the number of computing nodes in the boot waiting state and a boot latency.

Here, it is conceivable that, in order to suppress occurrence of a boot waiting power loss, powered-off computing nodes among the computing nodes to be used for a job scheduled to be executed next are powered on to boot at a time point that, for example, the number of jobs executed by the computing nodes to be used for the job scheduled to be executed next are reduced to one. In this case, a part of the computing nodes wait in a state of not executing any job for the end of the job executed by the computing nodes to be used for the job scheduled to be executed next. Thus, needless power consumption (job-end waiting power loss) occurs during this job-end waiting.

Figure 8:
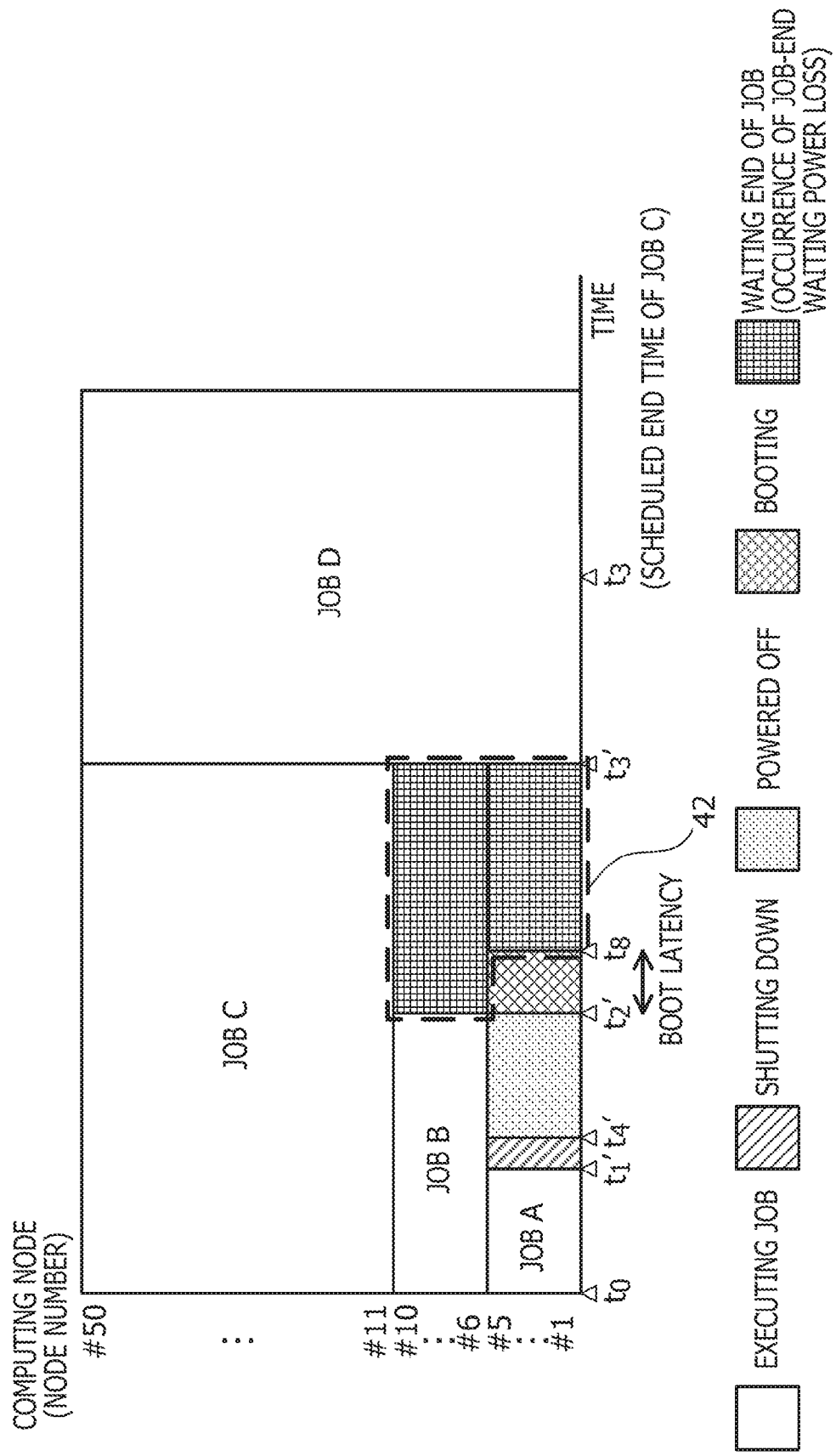
FIG. 8 is a diagram illustrating an example (first example) of occurrence of a job-end waiting power loss.

FIG. 8 is a diagram illustrating an example (first example) of occurrence of a job-end waiting power loss. In the example of FIG. 8, when the execution of the job B is ended, jobs executed by the computing nodes to be used for the job D are reduced to only the job C. Accordingly, suppose that the computing nodes having the node numbers "#1" to "#5", which are already in a powered-off state, are powered on to start boot at time $t_2'$ at which the execution of the job B is ended. This suppresses occurrence of computing nodes in a boot waiting state as illustrated in FIG. 7, and may also suppress occurrence of a boot waiting power loss. For example, no boot waiting power loss occurs when the execution of the job C is ended at or after time $t_8$ at which the boot of the computing nodes having the node numbers "#1" to "#5" is ended. Power consumption reduced by powering off the computing nodes not executing any job in the example of FIG. 8 is power consumption in a period from time $t_4'$ to time $t_2'$ in the computing nodes having the node numbers "#1" to "#5".

On the other hand, in the example illustrated in FIG. 8, the computing nodes having the node numbers "#1" to "#10" wait in a state of not executing any job until time $t_3'$ at which the execution of the job C is ended. The state of the computing nodes thus waiting in a state of not executing any job for an end of execution of a job in other computing nodes will be referred to as a state of waiting end of job (job-end waiting state).

The computing nodes in the job-end waiting state consume power while waiting for the end of execution of the job in the other computing nodes. The power consumed at this time is a job-end waiting power loss. A value obtained by integrating the job-end waiting power loss with respect to time is a job-end waiting energy loss 42. The job-end waiting energy loss 42 is a sum of energy consumption of the respective computing nodes in the job-end waiting state. An energy loss of a computing node in the job-end waiting state is a value obtained by multiplying power consumption per computing node in a state of not executing any job by a time for which the computing node is in the job-end waiting state.

Such a job-end waiting energy loss 42 is a large energy when the job C is ended just at the scheduled time without being ended earlier. Accordingly, it is conceivable that the job-end waiting energy loss 42 is reduced by setting back, from time $t_2'$ at which the execution of the job B is ended, the time of powering on the powered-off computing nodes among the computing nodes to be used for the job scheduled to be executed next.

Figure 9:
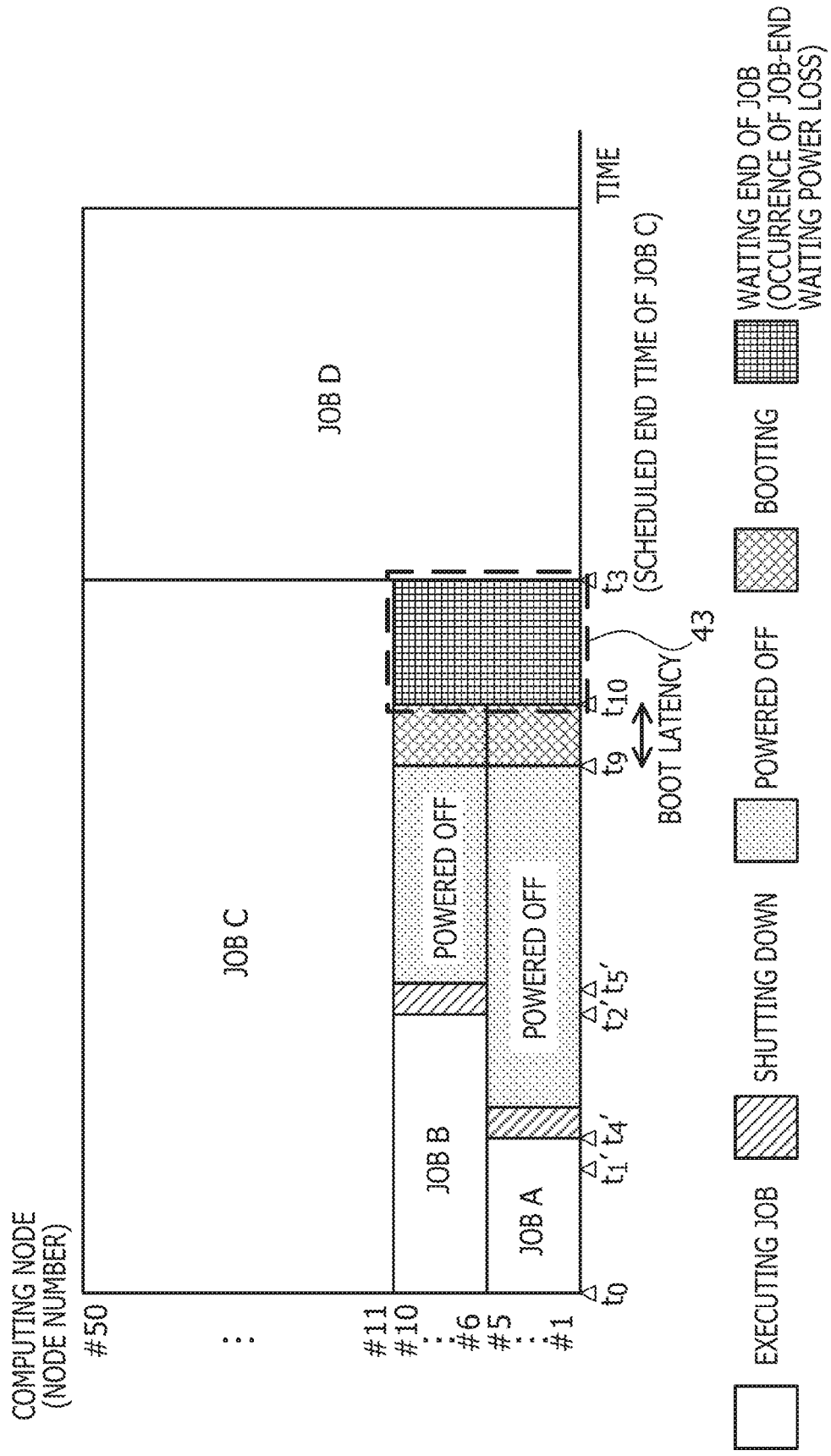
FIG. 9 is a diagram illustrating an example (second example) of occurrence of a job-end waiting power loss.

FIG. 9 is a diagram illustrating an example (second example) of occurrence of a job-end waiting power loss. In the example of FIG. 9, the computing nodes having the node numbers "#1" to "#10", which have executed the jobs A and B, shut down when the execution of the respective jobs A and B are ended, and the computing nodes having the node numbers "#1" to "#10" are thereafter powered off. Then, the computing nodes having the node numbers "#1" to "#10" are powered on and the boot is started at time $t_9$ that is subsequent to time $t_2'$ at which the execution of the job B is ended and which precedes the scheduled end time (time $t_3$) of the job C by a boot latency or more. The boot is completed at time $t_{10}$. In this case, a job-end waiting power loss of the computing nodes having the node numbers "#1" to "#10" occurs in a period from time $t_{10}$ to the end of execution of the job C. A job-end waiting energy loss 43 is maximized in a case where the execution of the job C is performed until the scheduled end time (time $t_3$), as illustrated in FIG. 9.

Here, the more the time of starting the boot of the computing nodes having the node numbers "#1" to "#10" is delayed, the more the job-end waiting energy loss 43 is decreased, but the greater a possibility of occurrence of a boot waiting power loss becomes as illustrated in FIG. 7. A magnitude relation between the boot waiting energy loss 41 (see FIG. 7) and the job-end waiting energy loss 43 (see FIG. 9) varies depending on a magnitude relation between the number of computing nodes used to execute the jobs A and B and the number of computing nodes used to execute the job C.

Accordingly, the job scheduler 120 determines a time of powering on to start boot of the powered-off computing nodes before the end of execution of the job C so as to minimize an energy loss. Details are as follows.

In a case where the job C is ended during a period from time $t_{10}$ to time $t_3$ in FIG. 9, execution of the job D may be started immediately after completion of the job C. No power loss occurs after the start of the execution of the job D.

On the other hand, in a case where the end time of the job C is in a period from time $t_9$ to time $t_{10}$ in FIG. 9, the time of the start of execution of the job D is time $t_{10}$. In this case, no job-end waiting power loss occurs. However, for a start of execution of the job D, a boot waiting power loss occurs in the computing nodes having the node numbers "#11" to "#50" in the period from the end time of the job C to time $t_{10}$ at which the boot of the computing nodes having the node numbers "#1" to "#10" is completed.

Though an actual end time of the job is earlier than the scheduled end time determined based on the scheduled execution length specified by the user, it is difficult to know in advance or predict the actual end time of the job. When this is taken into consideration, a possibility of occurrence of a boot waiting power loss is to be accepted as long as control of powering off the computing nodes in a state of not executing any job is performed for power saving.

The job scheduler 120 performs power supply control of the computing nodes in a state of not executing any job so as to increase a possibility that the job-end waiting energy loss is smaller than the boot waiting energy loss. For example, the job scheduler 120 evaluates a relation between the boot waiting energy loss and the job-end waiting energy loss in a case where a boot start time of the powered-off computing nodes is set as the present time. The boot start time is a time at which the computing nodes are powered on to start the boot. Then, the job scheduler 120 determines depending on the relation between the boot waiting energy loss and the job-end waiting energy loss whether or not to give a power-on instruction to the powered-off computing nodes. For example, the job scheduler 120 determines that a power-on instruction is to be given to the powered-off computing nodes when "Job-End Waiting Energy Loss≤Boot Waiting Energy Loss".

FIG. 10 is a diagram illustrating an example of determining a boot start time of powered-off computing nodes. When the number of jobs being executed by the computing nodes to be used for execution of the job D are reduced to one (the job C), for example, the job scheduler 120 determines whether or not the present time is an appropriate time for powering on the powered-off computing nodes.

For example, the job scheduler 120 calculates the boot waiting energy loss 41 based on the number of computing nodes executing the job C. In addition, the job scheduler 120 calculates a job-end waiting energy loss in a case where the powered-off computing nodes are powered on to start boot right now.

Boot Waiting Energy Loss=Number of Usage Computing Nodes of Job (Job C) being Executed× Power Loss per Computing Node×Boot Latency (1)

Job-End Waiting Energy Loss=Number of Powered-off Nodes among Usage Computing Nodes of Job (Job D) to be Executed Next×Power Loss per Computing Node×Maximum Job-End Waiting Time (2)

The maximum job-end waiting time is a value obtained by subtracting an end time (time $t_{12}$) of the boot after the power-on of the powered-off computing nodes from the scheduled end time (time $t_3$) of the job C. The end time (time $t_{12}$) of the boot is a time after passage of a boot latency from the present time $t_{11}$.

The boot waiting energy loss 41 (the area of a shaded rectangular region enclosed by broken lines) and the job-end waiting energy loss 44 (the area of a shaded rectangular region enclosed by broken lines) may be thus calculated. The job scheduler 120 periodically repeats the calculation of the boot waiting energy loss 41 and the job-end waiting energy loss 44 and evaluation based on comparison between the values thereof.

The longer a time to the scheduled end time (time $t_3$) of the job C, the larger the job-end waiting energy loss 44. For example, the job-end waiting energy loss 44 decreases with the passage of time. Then, even though the job-end waiting energy loss 44 is larger than the boot waiting energy loss 41 at time $t_5'$ at which the computing nodes having the node numbers "#6" to "#10", which have executed the job B, are powered off, the job-end waiting energy loss 44 approaches the boot waiting energy loss 41 with the passage of time. Eventually, time $t_{11}$ arrives at which the job-end waiting energy loss 44 and the boot waiting energy loss 41 coincide with each other, as illustrated in FIG. 10.

When the boot of the computing nodes having the node numbers "#1" to "#10" is started at time $t_{11}$, an energy loss may be controlled to be the boot waiting energy loss at a maximum.

The calculated boot waiting energy loss and the calculated job-end waiting energy loss are maximum values of the energy loss that may occur, which are estimated at a time point of evaluation. The energy loss that actually occurs is determined depending on an end time of execution of the job C.

Figure 11:
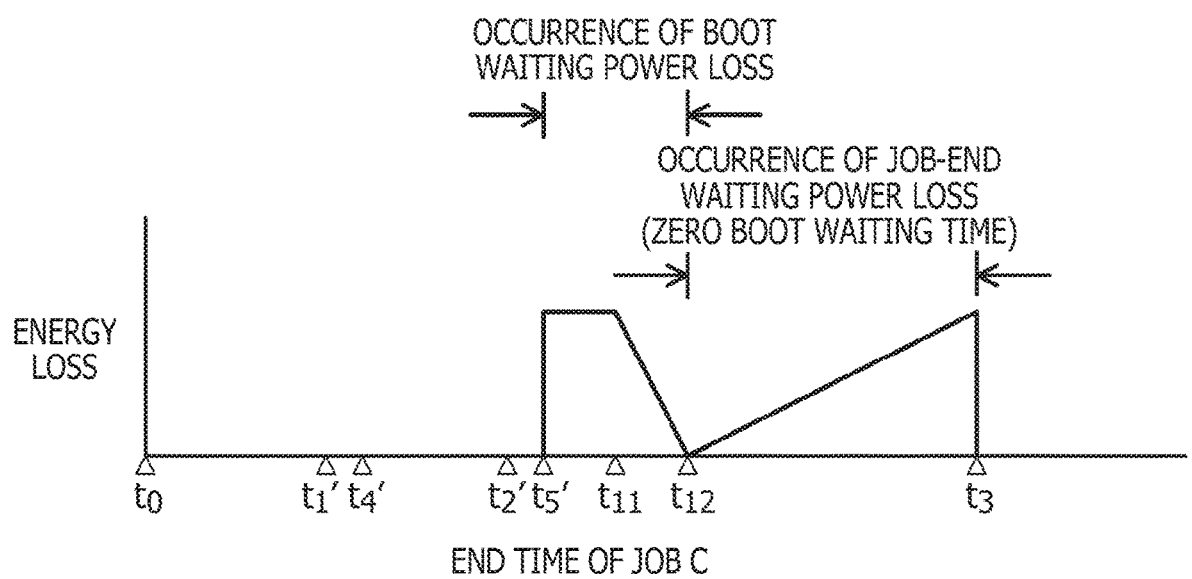
FIG. 11 is a diagram illustrating relation between an end time of a job C and an energy loss.

FIG. 11 is a diagram illustrating relation between the end time of the job C and the energy loss. In FIG. 11, the horizontal axis indicates the end time of the job C, and the vertical axis indicates the energy loss.

In a case where the execution of the job C is ended within a period from time $t_5'$ at which the computing nodes having the node numbers "#6" to "#10", which have executed the job B, are powered off to time $t_{12}$ at which the boot of the computing nodes having the node numbers "#1" to "#10" is completed, a power loss that occurs is a boot waiting power loss. The energy loss when the execution of the job C is ended after time $t_5'$ at which the computing nodes having the node numbers "#6" to "#10", which have executed the job B, are powered off and before time $t_{11}$ at which the boot of the computing nodes having the node numbers "#1" to "#10" is started is the boot waiting energy loss calculated by Equation (1). When the execution of the job C is ended in a period from time $t_{11}$ to time $t_{12}$, the boot waiting time is shorter, and accordingly the boot waiting energy loss is also decreased. When the execution of the job C is ended at time $t_{12}$, the execution of the job D may be started immediately, and no power loss occurs, so that the energy loss is "0".

In a case where the execution of the job C is ended within a period from time $t_{12}$ to the scheduled end time (time $t_3$) of the job C, a power loss that occurs is a job-end waiting power loss. The boot waiting time is "0" in the period in which the job-end waiting power loss occurs. The later the end time of execution of the job C, the longer the job-end waiting time, and the larger the job-end waiting energy loss. When the execution of the job C is ended at the scheduled end time (time $t_3$) of the job C, the job-end waiting energy loss becomes a maximum value.

As illustrated in FIG. 11, the energy loss that occurs is the boot waiting energy loss calculated by Equation (1) at a maximum. When the end time of execution of the job C is within a period between time $t_{11}$ and time $t_3$, the energy loss that occurs is smaller than the boot waiting energy loss calculated by Equation (1). As a result, a power saving due to a reduction of the energy loss is achieved.

Furthermore, because the boot start time of the computing nodes having the node numbers "#1" to "#10" is moved up as compared with the example illustrated in FIG. 7, the boot waiting time is "0" when the end time of execution of the job C is at or after time $t_{12}$. As a result, usage efficiency of the HPC system is improved.

A method of such power saving control will be described in detail in the following. The evaluation of the energy loss is performed using the job scheduling table 111 and the node usage schedule table 112.

Figure 12:
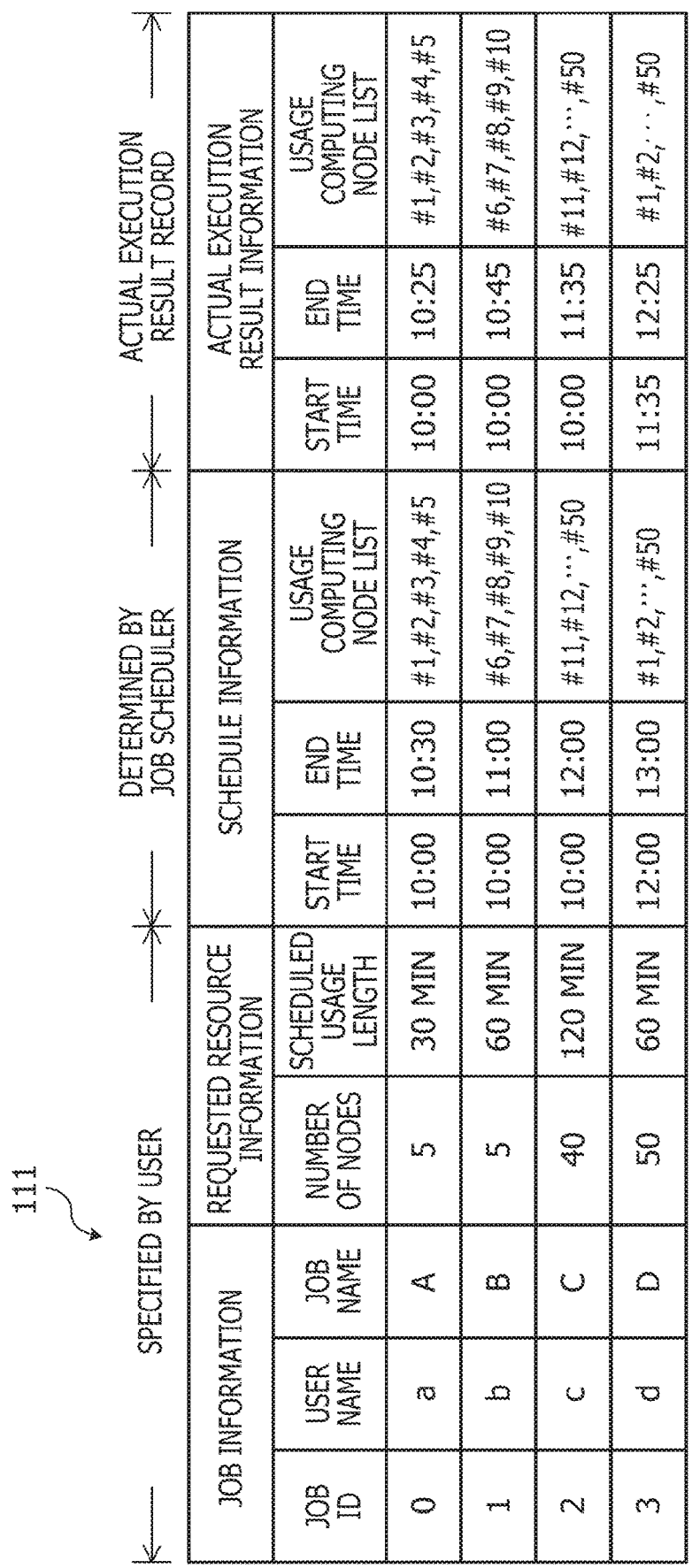
FIG. 12 is a diagram illustrating an example of a job scheduling table.

FIG. 12 is a diagram illustrating an example of the job scheduling table 111. Records for respective jobs are registered in the job scheduling table 111, and each of the records includes job information, requested resource information, schedule information, and actual execution result information. Of these pieces of information, the job information and the requested resource information are information specified by the user. The schedule information is information determined by the job scheduler 120. The actual execution result information are information recorded by the job scheduler 120 as actual results of execution of the jobs.

The job information is information on the job to be executed. For example, the job information includes a job identifier (ID), a user name, and a job name. The job ID is an identification number of the job. The user name is a name of the user requesting execution of the job. The job name is a name of the job.

The requested resource information is information on computing resources to be used for execution of the job. For example, the requested resource information includes the number of nodes and a scheduled usage length. The number of nodes is the number of computing nodes to be used for execution of the job. The scheduled usage length is a time length for which the computing nodes are scheduled to be used when executing the job (time length for which the computing nodes are scheduled to be occupied).

The schedule information is information on the execution schedule of the job. For example, the schedule information includes a start time, an end time, and a usage computing node list. The start time is a time at which the execution of the job is scheduled to be started. The end time is a time at which the execution of the job is scheduled to be ended. The usage computing node list is a list of the computing nodes to be used for the execution of the job.

The actual execution result information is information on an actual result of execution of the job. For example, the actual execution result information includes a start time, an end time, and a usage computing node list. The start time is a time at which the execution of the job is started. The end time is a time at which the execution of the job is ended. The usage computing node list is a list of computing nodes used for the execution of the job.

FIG. 13 is a diagram illustrating an example of the node usage schedule table 112. Records for respective computing nodes are registered in the node usage schedule table 112, and each of the records includes node information and job execution information.

The node information is information on the state of power to be supplied to a computing node included in the HPC system. The node information includes a node number and a power supply state. The node number is a number uniquely set to the computing node. The power supply state is a state of power to be supplied to the computing node. "ON" is set as the power supply state when the power of the computing node is on. "OFF" is set as the power supply state when the power of the computing node is off.

The job execution information is information on a job (active job) currently being executed by the computing node and a job (next job) scheduled to be executed next by the computing node. The job execution information includes a job name and scheduled end time of the active job and a job name and scheduled start time of the next job.

Information set in the node usage schedule table 112 illustrated in FIG. 13 indicates a state in which the execution of the job A is ended and the jobs B and C are being executed. The job execution information is thereafter updated when the execution of the job B is ended. When powered-off computing nodes are powered on before the end of the execution of the job C, the power supply state of the node information is updated with regard to the computing nodes.

FIG. 14 is a diagram illustrating an example of the node usage schedule table after the updates. When the execution of the job B is ended, the name of the job B is deleted from the job name of the active job in the job execution information. When the computing nodes having the node numbers "#1" to "#10" are powered on, the power supply state of the corresponding nodes becomes "ON".

Power supply control process performed by the job scheduler 120 will be described with reference to a flowchart.

Figure 15:
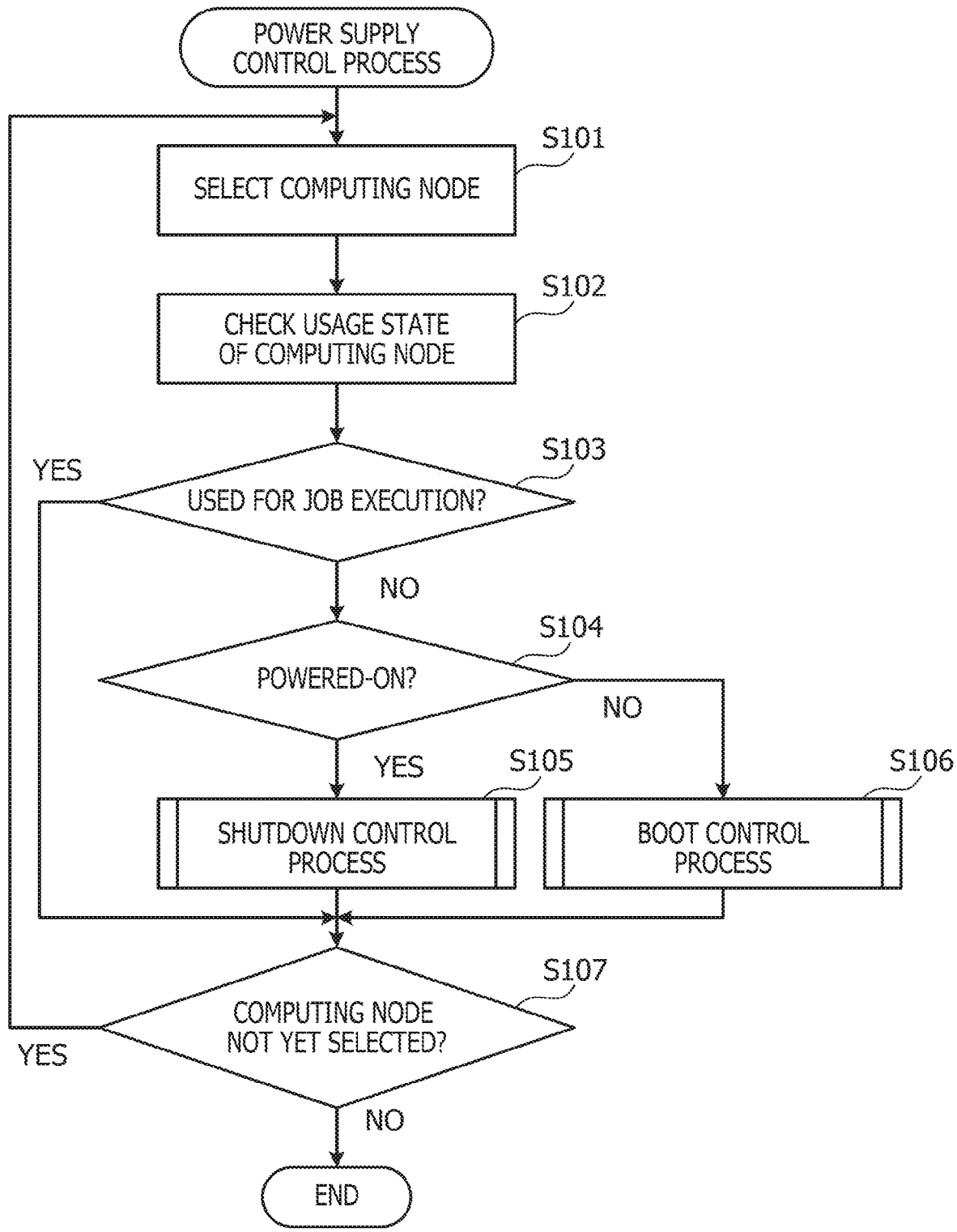
FIG. 15 is a flowchart illustrating an example of a power supply control process.

FIG. 15 is a flowchart illustrating an example of a power supply control process. The power supply control process is, for example, periodically performed by the job scheduler 120. The job scheduler 120 may perform the power supply control process at the timing that information within the job scheduling table 111 is updated. The process illustrated in FIG. 15 will be described in the following.

(Step S101) The job scheduler 120 selects one computing node.

(Step S102) The job scheduler 120 checks the usage state of the selected computing node. For example, the job scheduler 120 refers to the node usage schedule table 112, and checks based on the power supply state of the node information of the selected computing node whether the power of the selected computing node is on or off. In addition, the job scheduler 120 refers to the node usage schedule table 112, and checks whether or not the computing node is executing a job based on whether or not the job name of an active job is set in the job execution information of the selected computing node.

As a result, the job usage state of the computing node is classified into the following three states: 1. a state of being used for job execution; 2. a state of not being used for job execution and powered on; and 3. a state of not being used for job execution and powered off.

(Step S103) The job scheduler 120 determines whether or not the selected computing node is being used for job execution. When it is determined that the selected computing node is being used for job execution, the selected computing node is being used effectively as a computing node of the HPC system, and thus the job scheduler 120 advances the processing to step S107, and ends the processing for the selected computing node. When it is determined that the selected computing node is not used for job execution, the job scheduler 120 advances the processing to step S104.

(Step S104) The job scheduler 120 determines whether or not the power of the selected computing node is on. When it is determined that the power of the selected computing node is on, the job scheduler 120 advances the processing to step S105. When it is determined that the power of the selected computing node is off, the job scheduler 120 advances the processing to step S106.

(Step S105) The job scheduler 120 performs a shutdown control process for a computing node that is not used for job execution and the power thereof is on. In the shutdown control process, a shutdown instruction is output to the selected computing node when a predetermined condition is satisfied. Details of the shutdown control process will be described later (see FIG. 16). Thereafter, the job scheduler 120 advances the processing to step S107.

(Step S106) The job scheduler 120 performs a boot control process for a computing node that is not used for job execution and the power thereof is off. In the boot control process, a power-on instruction is output to the selected computing node when a predetermined condition is satisfied. Details of the boot control process will be described later (see FIG. 17).

(Step S107) The job scheduler 120 determines whether or not there is a computing node not selected yet. When it is determined that there is a computing node not selected yet, the job scheduler 120 returns the processing to step S101. When it is determined that all of the computing nodes are already selected, the job scheduler 120 ends the power supply control process.

The shutdown control process will be described in detail.

Figure 16:
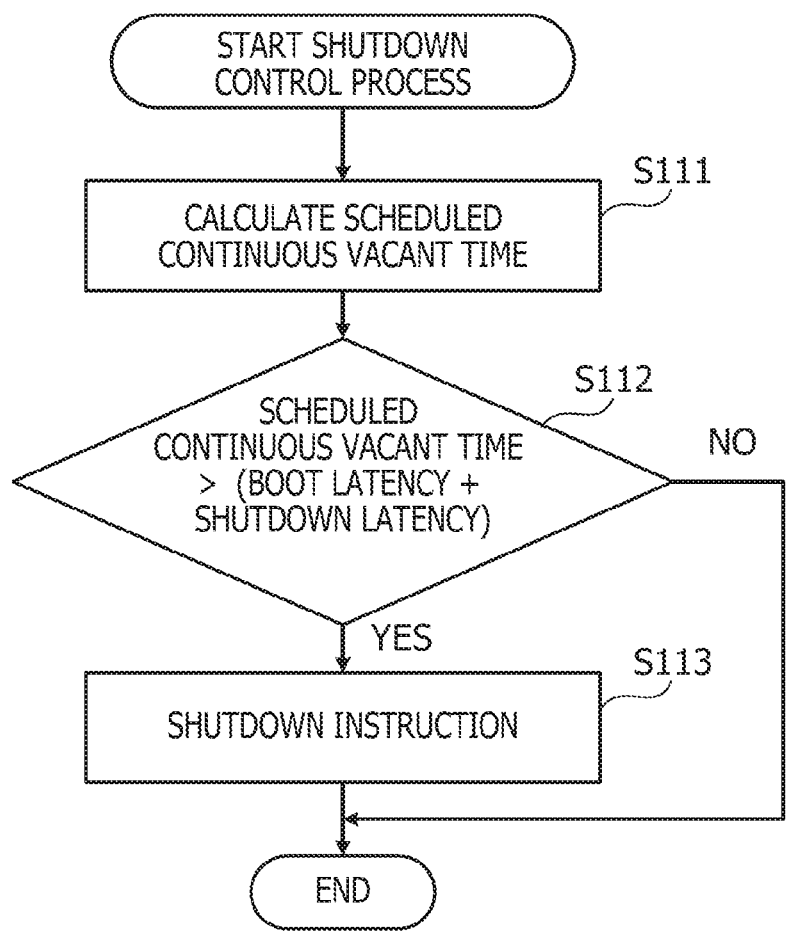
FIG. 16 is a flowchart illustrating an example of a shutdown control process.

FIG. 16 is a flowchart illustrating an example of a shutdown control process. The process illustrated in FIG. 16 will be described in the following.

(Step S111) The job scheduler 120 identifies a job (next job) scheduled to be executed next and calculates a scheduled continuous vacant time based on the node usage schedule table 112. The scheduled continuous vacant time is a difference between the scheduled start time of the next job executed by the selected computing node and the present time.

(Step S112) The job scheduler 120 determines whether or not the scheduled continuous vacant time is longer than "Boot Latency+Shutdown Latency". When it is determined that the scheduled continuous vacant time is longer, the job scheduler 120 advances the processing to step S113. When it is determined that the scheduled continuous vacant time is equal to or less than "Boot Latency+Shutdown Latency", the job scheduler 120 ends the shutdown control process without shutdown of the selected computing node.

(Step S113) The job scheduler 120 transmits a shutdown instruction to the selected computing node. Upon receiving the shutdown instruction, the computing node performs shutdown of a system such as an OS, and subsequently performs a power-off process.

A reduction in power consumption may be achieved by the shutdown of the computing node when the scheduled continuous vacant time is longer than a total time of the shutdown latency and boot latency of the computing node.

Figure 17:
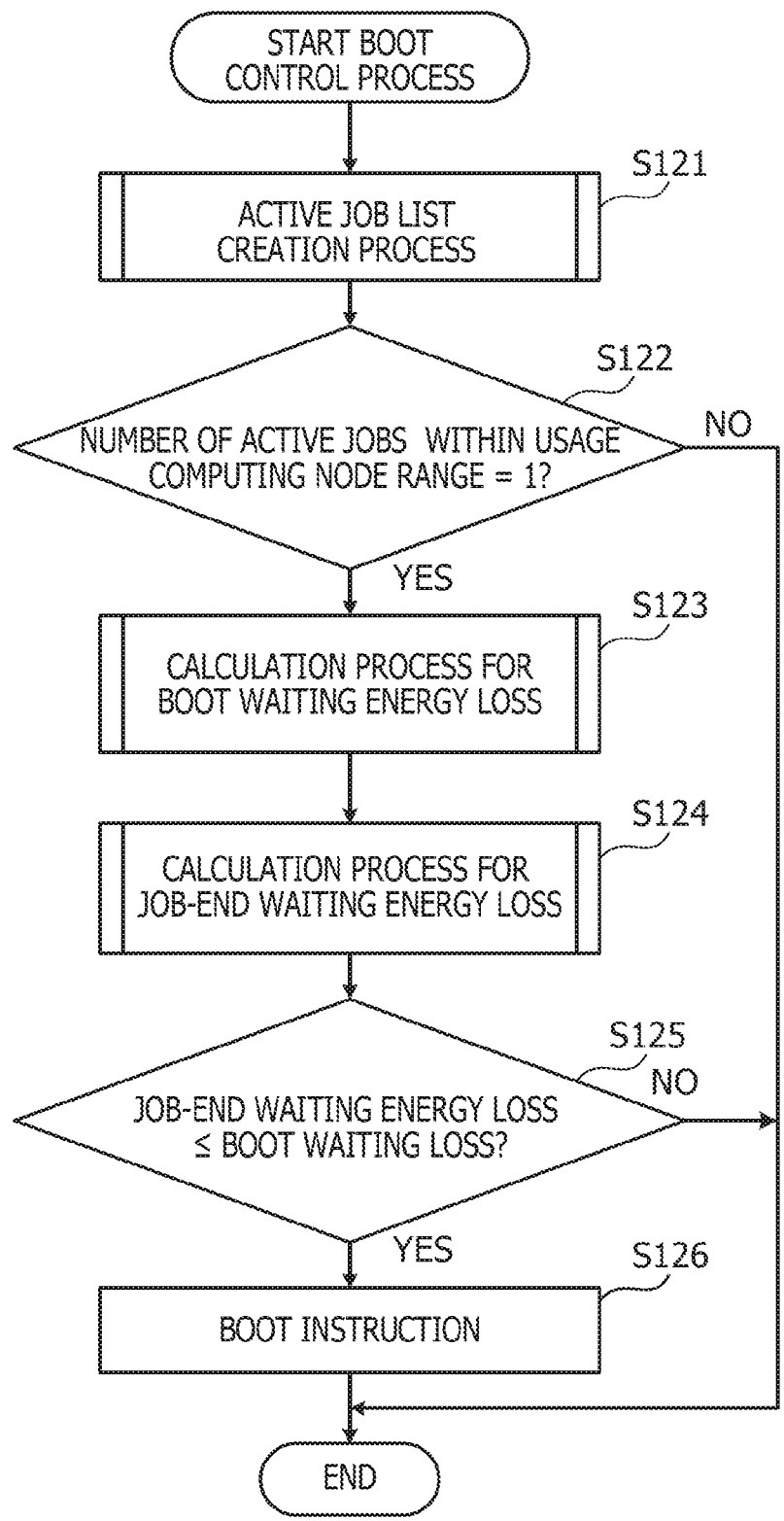
FIG. 17 is a flowchart illustrating an example of a boot control process.

FIG. 17 is a flowchart illustrating an example of a boot control process. The process illustrated in FIG. 17 will be described in the following.

(Step S121) The job scheduler 120 performs active job list creation process for the selected computing node. In the active job list creation process, an active job list is created. The active job list is a list of jobs being executed by computing nodes (usage computing nodes) to be used for the next job of the selected computing node. Details of the active job list creation process will be described later (see FIG. 18).

(Step S122) The job scheduler 120 determines whether or not the number of active jobs within a range of the usage computing nodes is "1" based on the created active job list. The number of active jobs within the range of the usage computing nodes is the number of jobs currently being executed by any of the usage computing nodes. For example, when a job name of an active job is set in the job execution information within the record of a usage computing node in the node usage schedule table 112, the job scheduler 120 determines that the usage computing node is executing the job. When it is determined that the number of active jobs is "1", the job scheduler 120 advances the processing to step S123. When it is determined that the number of active jobs is not "1", the job scheduler 120 ends the boot control process.

When the selected computing node does not have a next job, the active job list is not created in step S121. When the active job list is not created, the job scheduler 120 regards the number of active jobs as "0", and ends the boot control process.

(Step S123) The job scheduler 120 performs a calculation process for a boot waiting energy loss at the present time. Details of the calculation process for the boot waiting energy loss will be described later (see FIG. 19).

(Step S124) The job scheduler 120 performs a calculation process for a job-end waiting energy loss at the present time. Details of the calculation process for the job-end waiting energy loss will be described later (see FIG. 20).

(Step S125) The job scheduler 120 determines whether or not the job-end waiting energy loss is equal to or less than the boot waiting energy loss. When it is determined that the job-end waiting energy loss is equal to or less than the boot waiting energy loss, the job scheduler 120 advances the processing to step S126. When it is determined that the job-end waiting energy loss is larger than the boot waiting energy loss, the job scheduler 120 ends the boot control process without boot of the selected computing node.

(Step S126) The job scheduler 120 transmits a power-on instruction to the selected computing node. Upon receiving the power-on instruction, the computing node performs a power-on process to start the boot.

Thus, with regard to the next job of the selected computing node, at a time point that the job-end waiting energy loss becomes equal to or less than the boot waiting energy loss, the selected computing node is powered on to start the boot.

Figure 18:
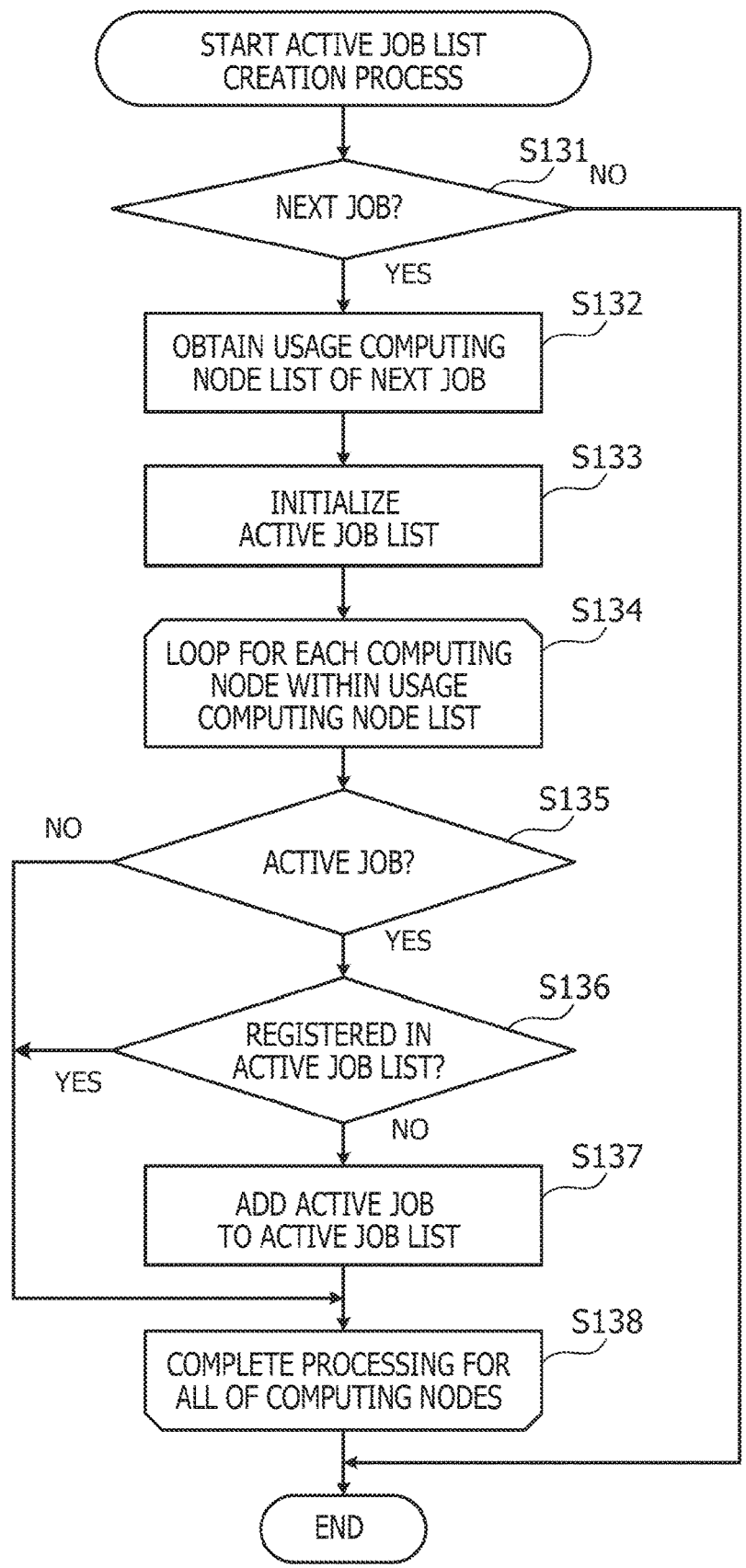
FIG. 18 is a flowchart illustrating an example of an active job list creation process.

FIG. 18 is a flowchart illustrating an example of an active job list creation process. The process illustrated in FIG. 18 will be described in the following.

(Step S131) The job scheduler 120 determines whether or not there is a next job scheduled to be executed by the selected computing node. For example, the job scheduler 120 determines that there is a next job when a job name of the next job is set in the job execution information of the record of the selected computing node in the node usage schedule table 112. When it is determined that there is a next job, the job scheduler 120 advances the processing to step S132. When it is determined that there is no next job, the job scheduler 120 ends the active job list creation process without creating the active job list.

(Step S132) The job scheduler 120 obtains a usage computing node list indicating computing nodes to be used for execution of the next job. For example, the job scheduler 120 obtains the usage computing node list from the schedule information within the record of the next job in the job scheduling table 111.

(Step S133) The job scheduler 120 initializes an active job list.

(Step S134) The job scheduler 120 performs the processing of steps S135 to S137 for each of the computing nodes within the usage computing node list.

(Step S135) The job scheduler 120 determines whether or not there is a job (active job) currently executed by a relevant computing node. For example, the job scheduler 120 determines that there is an active job when a job name of an active job is set within the record of the relevant computing node in the node usage schedule table 112. When it is determined that there is an active job, the job scheduler 120 advances the processing to step S136. When it is determined that there is no active job, the job scheduler 120 advances the processing to step S138.

(Step S136) The job scheduler 120 determines whether or not the active job that is detected in step S135 is already registered in the active job list. When it is determined that the active job is registered, the job scheduler 120 advances the processing to step S138. When it is determined that the active job is not yet registered, the job scheduler 120 advances the processing to step S137.

(Step S137) The job scheduler 120 additionally registers the active job, which is detected in step S135, into the active job list.

(Step S138) The job scheduler 120 ends the active job list creation process when completing the processing for all of the computing nodes within the usage computing node list.

The number of jobs registered in the active job list thus created is the number of active jobs in step S122 of the boot control process (see FIG. 17). When the number of active jobs is "1", the boot waiting energy loss and the job-end waiting energy loss are calculated.

Figure 19:
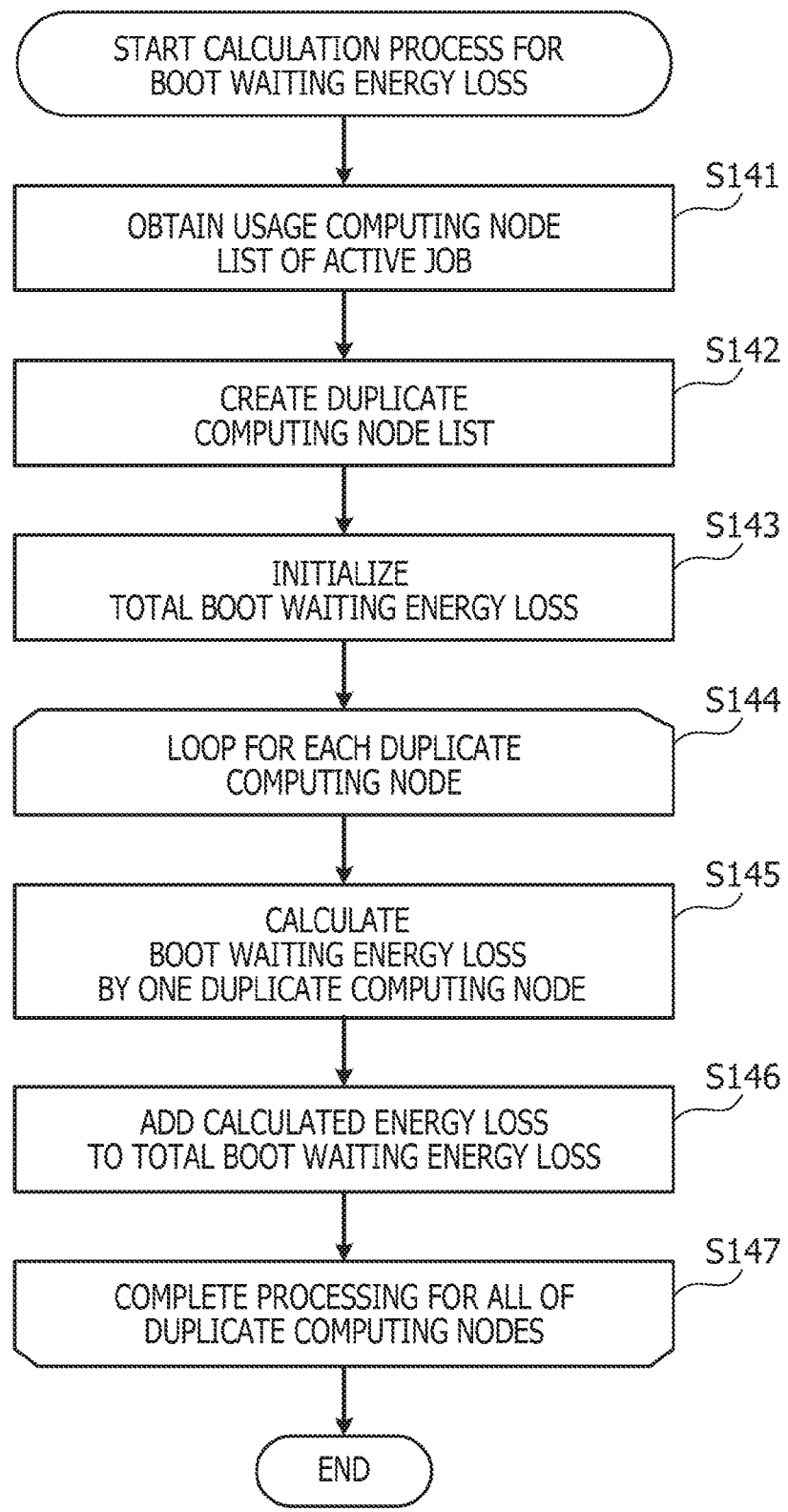
FIG. 19 is a flowchart illustrating an example of a calculation process for a boot waiting energy loss.

FIG. 19 is a flowchart illustrating an example of a calculation process for a boot waiting energy loss. The process illustrated in FIG. 19 will be described in the following.

(Step S141) The job scheduler 120 obtains a usage computing node list indicating computing nodes used for execution of the active job based on the active job list. For example, the job scheduler 120 obtains the usage computing node list from the schedule information within the record of the active job in the job scheduling table 111.

(Step S142) The job scheduler 120 creates a duplicate computing node list indicating computing nodes (duplicate computing nodes) registered in both the usage computing node list of the next job and the usage computing node list of the active job.

(Step S143) The job scheduler 120 initializes a total boot waiting energy loss. For example, the job scheduler 120 sets "0" to a variable indicating the total boot waiting energy loss.

(Step S144) The job scheduler 120 performs the processing of steps S145 and S146 for each of the duplicate computing nodes registered in the duplicate computing node list.

(Step S145) The job scheduler 120 calculates a boot waiting energy loss by a relevant duplicate computing node. For example, the job scheduler 120 sets "Power Loss (power consumption in a state of not executing any job) per Computing Node×Boot Waiting Time (boot latency)" as the energy loss due to boot waiting with respect to the relevant duplicate computing node.

(Step S146) The job scheduler 120 adds the boot waiting energy loss calculated in step S145 to the value of the variable indicating the total boot waiting energy loss. A sum of boot waiting energy losses calculated for the respective duplicate computing nodes is thereby calculated.

(Step S147) The job scheduler 120 ends the calculation process for the boot waiting energy loss upon completing the processing for all of the duplicate computing nodes.

The value thus set to the variable indicating the total boot waiting energy loss is a boot waiting energy loss that may occur before a start of execution of the next job. Description will be made of the calculation process for the job-end waiting energy loss.

Figure 20:
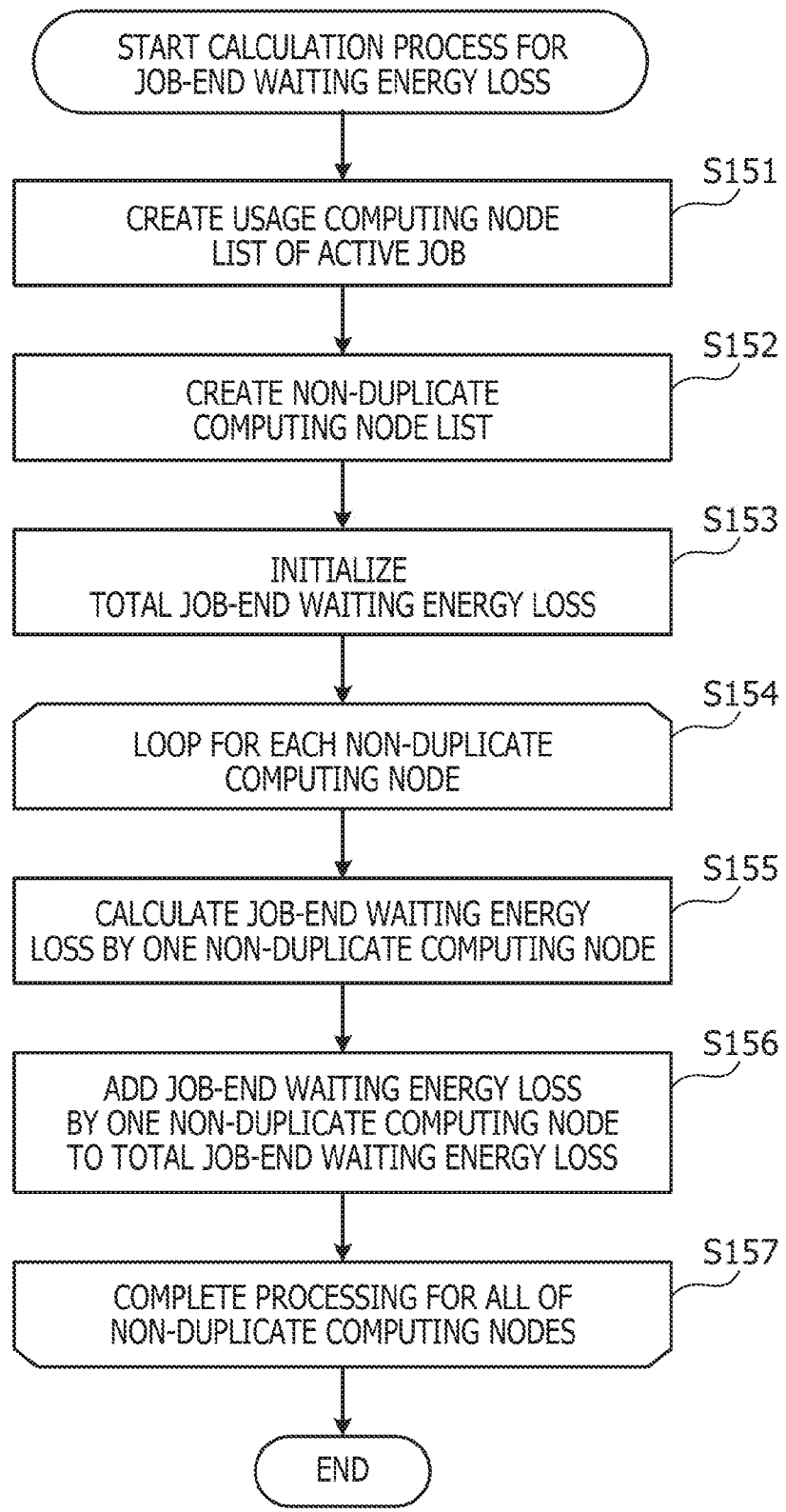
FIG. 20 is a flowchart illustrating an example of a calculation process for a job-end waiting energy loss.

FIG. 20 is a flowchart illustrating an example of a calculation process for a job-end waiting energy loss. The process illustrated in FIG. 20 will be described in the following.

(Step S151) The job scheduler 120 creates a usage computing node list indicating computing nodes being used for execution of the active job based on the active job list.

(Step S152) The job scheduler 120 creates a non-duplicate computing node list indicating computing nodes (non-duplicate computing nodes) not registered in the usage computing node list of the active job among the computing nodes registered in the usage computing node list of the next job.

(Step S153) The job scheduler 120 initializes a total job-end waiting energy loss. For example, the job scheduler 120 sets "0" to a variable indicating the total job-end waiting energy loss.

(Step S154) The job scheduler 120 performs the processing of steps S155 and S156 for each of the non-duplicate computing nodes registered in the non-duplicate computing node list.

(Step S155) The job scheduler 120 calculates a job-end waiting energy loss by a relevant non-duplicate computing node. For example, the job scheduler 120 sets "Power Loss (power consumption in a state of not executing any job) per Computing Node×Job-End Waiting Time" as the energy loss due to job-end waiting with respect to the relevant non-duplicate computing node. The job-end waiting time is a time from a time after the passage of a boot latency from the present time to the scheduled end time of the active job.

(Step S156) The job scheduler 120 adds the job-end waiting energy loss calculated in step S155 to the value of the variable indicating the total job-end waiting energy loss. A sum of job-end waiting energy losses calculated for the respective non-duplicate computing nodes is thereby calculated.

(Step S157) The job scheduler 120 ends the calculation process for the job-end waiting energy loss upon completing the processing for all of the non-duplicate computing nodes.

The value thus set to the variable indicating the total job-end waiting energy loss is a job-end waiting energy loss that occurs before a start of execution of the next job. When the job-end waiting energy loss becomes equal to or less than the boot waiting energy loss, the powered-off usage computing nodes are powered on to started the boot. Consequently, as illustrated in FIG. 11, the energy loss that occurs is the boot waiting energy loss at a maximum, and the energy loss is reduced when the execution of the job C currently being executed is ended in a period from time $t_{11}$ to time $t_3$ illustrated in FIG. 11. The scheduled execution lengths of jobs are often specified longer to provide a margin, and most jobs are ended before the scheduled end times of the jobs. As a result, the energy loss is reduced.

Third Embodiment

A third embodiment will next be described. In the third embodiment, the boot waiting energy loss is multiplied by a coefficient α (α is a real number of one or more) in evaluating the energy loss, and the result is compared with the job-end waiting energy loss. For example, the job scheduler 120 compares the job-end waiting energy loss and the boot waiting energy loss with each other, and the job scheduler 120 power on a powered-off computing node when a predetermined evaluation condition is satisfied, or the job scheduler 120 holds the powered-off computing node as it is when the predetermined evaluation condition is not satisfied. At this time, the job scheduler 120 uses a condition that "Job-End Waiting Energy Loss≤Coefficient α×Boot Waiting Energy Loss" as the evaluation condition for the energy loss.

The value of the coefficient α may be specified by a system administrator in advance, for example. For example, the stronger a tendency for a scheduled job execution time specified by a user and an actual execution time to differ from each other greatly (job execution ends earlier), the larger a value that the administrator sets to the coefficient α. This is because there is a fear that the energy loss that actually occurs results only from boot waiting.

Figure 21:
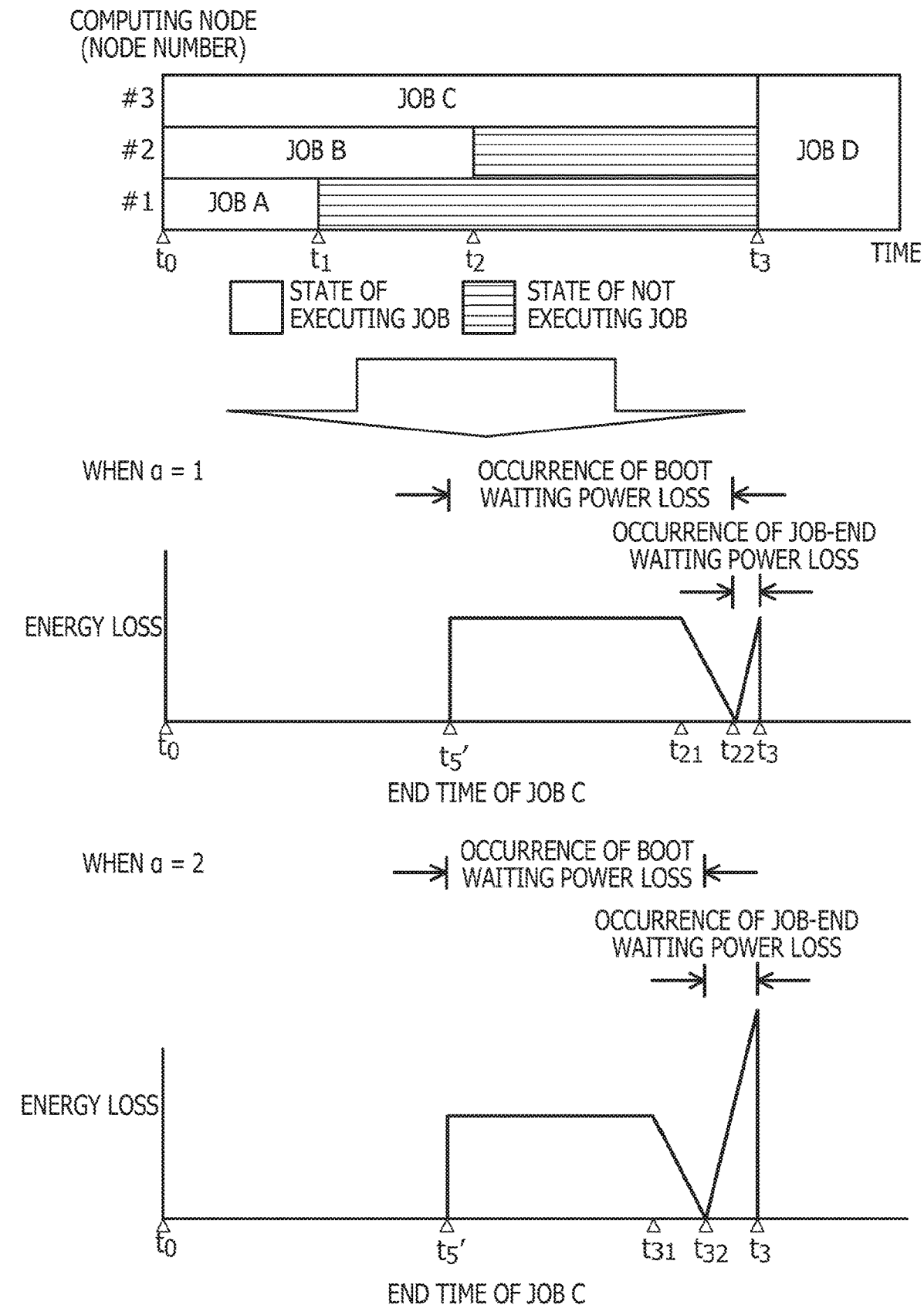
FIG. 21 is a diagram illustrating an example of a difference in an energy loss when a value of a coefficient α differs.

FIG. 21 is a diagram illustrating an example of a difference in an energy loss when a value of the coefficient α differs. The example of FIG. 21 supposes a case where each of jobs A, B, and C is executed by one computing node. Thus, the number of duplicate computing nodes at the time of calculation of the boot waiting energy loss is one, and the number of non-duplicate computing nodes at the time of calculation of the job-end waiting energy loss is two. When the value of the coefficient α is "1" in the case where the number of boot waiting computing nodes (the computing node having a node number "#3") is thus small as compared with the number of job-end waiting computing nodes (the computing nodes having node numbers "#1" and "#2"), time $t_{21}$ at which the boot of the computing nodes having the node numbers "#1" and "#2" is started is not moved up very much. As a result, a period (time $t_5'$ to time $t_{22}$) in which a boot waiting power loss occurs becomes very long as compared with a period (time $t_{22}$ to time $t_3$) in which a job-end waiting power loss occurs.

When the value of the coefficient α is set to "2", for example, in such a case, time $t_{31}$ at which the boot of the computing nodes having the node numbers "#1" and "#2" is started is moved up as compared with the case where the value of the coefficient α is "1". As a result, the period (time $t_5'$ to time $t_{32}$) in which a boot waiting power loss occurs is shortened, and the period (time $t_{22}$ to time $t_3$) in which a job-end waiting power loss occurs is lengthened.

Thus, even when the job C is ended well ahead the scheduled end time, an energy loss that actually occurs may be made smaller than the calculated boot waiting energy loss.

By thus setting an appropriate value to the coefficient α, it is possible to strike a balance between the boot waiting energy loss (actual result value) and the job-end waiting energy loss (actual result value) that actually occur within a certain period, and reduce the energy loss of the entire HPC system. Therefore, for power saving, it is desirable to set the coefficient α such that the boot waiting energy loss (actual result value) and the job-end waiting energy loss (actual result value) are at a comparable level.

Accordingly, in the third embodiment, the job scheduler 120 automatically adjusts the value of the coefficient α such that the boot waiting energy loss (actual result value) and the job-end waiting energy loss (actual result value) are at a comparable level. For example, the job scheduler 120 automatically evaluates and collects the coefficient α set in advance by the following method, and periodically optimizes the coefficient α.

For the optimization of the coefficient α, the job scheduler 120 records an actual result value of the energy loss in a node usage schedule table, for example.

FIG. 22 is a diagram illustrating an example of a node usage schedule table extended for recording an actual result of an energy loss. A node usage schedule table 112a according to the third embodiment also includes an evaluated value and an actual result value of the energy loss. The evaluated value and the actual result value of the energy loss are information on power losses that occur in a computing node. The evaluated value and the actual result value of the energy loss include a time (actual boot start time) at which the boot of the computing node is started, an evaluated value of the boot waiting energy loss, and an assumed value of the job-end waiting energy loss.

The evaluated value of the boot waiting energy loss for each computing node is, for example, "Number of Usage Computing Nodes of Active Job×Power Loss per Computing Node×Boot Latency". The assumed value of the job-end waiting energy loss is a job-end waiting energy loss in a case where the coefficient α is assumed to be set such that the boot of the powered-off computing node is completed at an actual end time of an active job. The assumed value of the job-end waiting energy loss is obtained by "Number of Powered-off Nodes among Usage Computing Nodes of Job to be Executed Next×Power Loss per Computing Node× Difference between Actual End Time of Active Job and Scheduled End Time of the Active Job".

FIG. 22 illustrates the node usage schedule table 112a in a state in which the execution of the job A is ended and the jobs B and C are being executed. Suppose that the execution of the job B is thereafter ended. Then, it is found that the last active job is the job C, and the evaluated value of the boot waiting energy loss may be calculated. Accordingly, when the execution of the job B is ended, the job scheduler 120 calculates the evaluated value of the boot waiting energy loss of each node, and sets the evaluated value of the boot waiting energy loss of each node in the node usage schedule table 112a.

Here, suppose that powered-off computing nodes are powered on before an end of execution of the job C. Then, the job scheduler 120 sets an actual boot start time of the powered-on computing nodes in the node usage schedule table 112a.

FIG. 23 illustrates the node usage schedule table 112a in which an evaluated value of a boot waiting energy loss and an actual boot start time are set. Computing nodes having node numbers "#1" to "#10" are powered on, and therefore the time of the power-on is set as the actual boot start time in the node usage schedule table 112a. In addition, the boot waiting energy loss of each computing node in a case where boot waiting energy loss occurs is set as the evaluated value of the boot waiting energy loss of the computing node.

When the execution of the job C is ended and the execution of the job D is started, the assumed value of the job-end waiting energy loss is determined. Then, the assumed value of the job-end waiting energy loss is set in the node usage schedule table 112a.

FIG. 24 is a diagram illustrating an example of calculating the assumed value of the job-end waiting energy loss. The assumed value of the job-end waiting energy loss is calculated based on a time at which the execution of the last active job is ended. FIG. 24 illustrates an example in a case where a boot waiting power loss occurs and an example in a case where a job-end waiting power loss occurs.

Suppose, for example, that the execution of the job C is ended at time $t_{41}$ before a start of the boot of the computing nodes having the node numbers "#1" to "#10" in a powered-off state. In this case, a boot waiting power loss occurs. In the present example, although no job-end waiting power loss actually occurs, a period from time $t_{42}$ at which the boot of the computing nodes having the node numbers "#1" to "#10" is completed to the scheduled end time (time $t_3$) of the job C is assumed to be a job-end waiting power loss occurrence period 45, and the assumed value of the job-end waiting energy loss for each computing node is calculated.

In addition, suppose that the boot of the computing nodes having the node numbers "#1" to "#10" in a powered-off state is started, and that the execution of the job C is ended at time $t_{43}$ after completion of the boot. In this case, a job-end waiting power loss occurs. Also in the present example, a period from time $t_{43}$ at which the execution of the job C is ended to the scheduled end time (time $t_3$) of the job C is assumed to be a job-end waiting power loss occurrence period 46, and the assumed value of the job-end waiting energy loss for each computing node is calculated.

When the assumed value of the job-end waiting energy loss and the boot waiting energy loss are obtained, the job scheduler 120 calculates a proper value of the coefficient α using these values. The job scheduler 120, for example, obtains a proper value of the coefficient α satisfying "Assumed Value of Job-End Waiting Energy Loss=Proper Value of Coefficient α×Boot Waiting Energy Loss". That is, the proper value of the coefficient α is a value obtained by dividing the assumed value of the job-end waiting energy loss by the boot waiting energy loss.

The proper value of the coefficient α is a value such that the power loss is made "0" if the coefficient α is set at the value. When the power loss that actually occurs is a boot waiting power loss, the proper value of the coefficient α is a value larger than the present value of the coefficient α. When the power loss that actually occurs is a job-end waiting power loss, the proper value of the coefficient α is a value smaller than the present value of the coefficient α. Therefore, when the present coefficient α is updated so as to approach the proper value of the coefficient α, the boot waiting energy loss (actual result value) and the job-end waiting energy loss (actual result value) that occur within a certain period may be at a comparable level.

The job scheduler 120 accumulates proper values of the coefficient α, calculated for each computing node. The job scheduler 120 then calculates a value of a corrected coefficient α based on the proper values of the coefficient α accumulated for a certain period. For example, the job scheduler 120 determines an average value of the coefficient α accumulated for a certain period as the value of the corrected coefficient α. Thereafter, the job scheduler 120 changes the value of the coefficient α to the determined average value.

Figure 25:
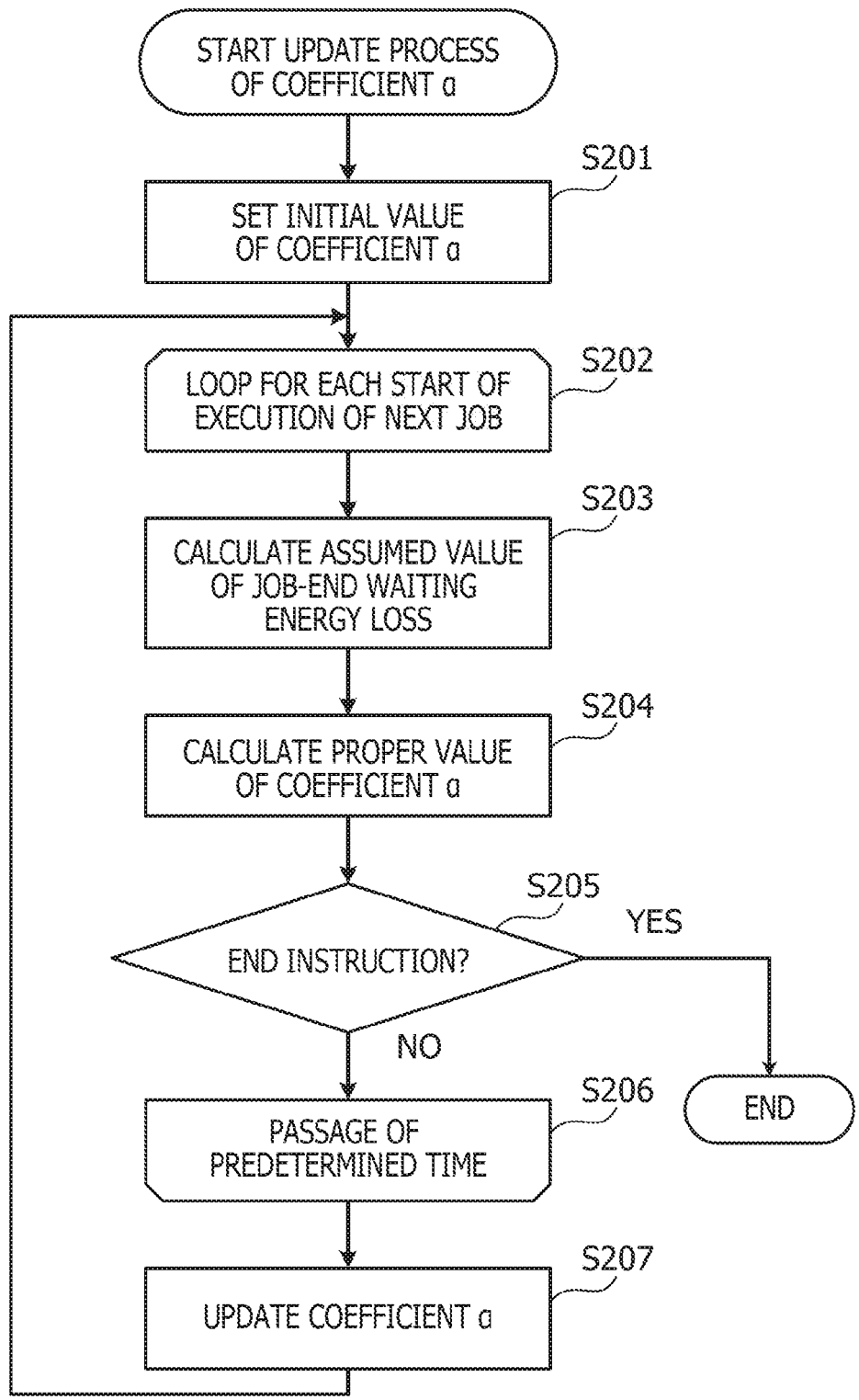
FIG. 25 is a flowchart illustrating an example of an update process of a coefficient α.

FIG. 25 is a flowchart illustrating an example of an update process of the coefficient α. The process illustrated in FIG. 25 will be described in the following.

(Step S201) The job scheduler 120 sets an initial value of the coefficient α. For example, the job scheduler 120 sets a value input in advance from an administrator as the initial value of the coefficient α.

(Step S202) The job scheduler 120 repeats the processing of steps S203 to S206 for each job whose execution is started within a certain period.

(Step S203) The job scheduler 120 calculates an assumed value of the job-end waiting energy loss for a relevant computing node.

(Step S204) The job scheduler 120 calculates a proper value of the coefficient α. For example, the job scheduler 120 sets, as the proper value of the coefficient α, a result obtained by dividing the assumed value of the job-end waiting energy loss, which is calculated in step S203, by the boot waiting energy loss of the relevant computing node. The job scheduler 120 stores the calculated proper value of the coefficient α in the memory 102 or the storage device 103.

(Step S205) The job scheduler 120 determines whether or not an end instruction to end the update process of the coefficient α is given. When it is determined that the end instruction is given, the job scheduler 120 ends the update process of the coefficient α.

(Step S206) The job scheduler 120 advances the processing to step S207 when a predetermined time has passed since a start of the iterative processing of steps S203 to S206.

(Step S207) The job scheduler 120 updates the coefficient α based on accumulated proper values of the coefficient α. For example, the job scheduler 120 sets an average of the proper values of the coefficient α as a new value of the coefficient α. Thereafter, the job scheduler 120 deletes the accumulated proper values of the coefficient α, and advances the processing to step S202.

Thus periodically updating the coefficient α optimizes the value of the coefficient α, and may reduce the power loss. The method of updating such a coefficient α is effective when magnitude relation of jobs executed in the HPC system and relation between scheduled execution lengths specified by users and actual execution times are maintained to a certain degree.

When the availability of the computing node is given priority over power saving as an operation policy of the HPC system, the value of the coefficient α may be set larger than in the case where the boot waiting energy loss (actual result value) and the job-end waiting energy loss (actual result value) are at a comparable level. That is, setting the value of the coefficient α larger increases a possibility that execution of a next job may be started with a zero boot waiting time, and thus improves the availability of the computing node.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory and the processor configured to:
   calculate a first energy consumption of a first computer, the first energy consumption being energy to be consumed during a boot latency when the first computer has already booted and is in a state of not executing any job, the boot latency being a length of time taken for boot of a second computer scheduled to execute a second job together with the first computer after an end of a first job executed by the first computer;
   calculate a second energy consumption of the second computer, the second energy consumption being energy to be consumed during a waiting time when the second computer has already booted and is in a state of not executing any job, the waiting time being obtained by subtracting the boot latency from a time difference between a scheduled end time stored in the memory and a present time, the scheduled end time being a time point at which the first job is scheduled to be ended; and
   perform power-on control of powering on the second computer when power of the second computer is off and when the second energy consumption becomes equal to or less than a threshold value determined based on the first energy consumption.

2. The information processing device according to claim 1, wherein
   the processor is further configured to:
   determine whether the time difference is larger than a sum of a shutdown latency and the boot latency when the second computer has already booted and is in a state of not executing any job before the power-on control is performed, the shutdown latency being a length of time taken for shutting down the second computer; and
   perform power-off control of powering off the second computer when it is determined that the time difference is larger than the sum.

3. The information processing device according to claim 1, wherein
   the processor is further configured to
set, as the threshold value, a value obtained by multiplying the first energy consumption by a coefficient equal to or more than zero.

4. The information processing device according to claim 3, wherein
   the processor is further configured to:
   calculate a third energy consumption of the second computer, the third energy consumption being energy to be consumed when the second computer has already booted and in a state of not executing any job in a period from a time point at which the first job is ended to the scheduled end time of the first job; and
   update a value of the coefficient based on a value obtained by dividing the third energy consumption by the first energy consumption.

5. A method of controlling computers, the method comprising:
   calculating, by a processor, a first energy consumption of a first computer, the first energy consumption being energy to be consumed during a boot latency when the first computer has already booted and is in a state of not executing any job, the boot latency being a length of time taken for boot of a second computer scheduled to execute a second job together with the first computer after an end of a first job executed by the first computer;
   calculating a second energy consumption of the second computer, the second energy consumption being energy to be consumed during a waiting time when the second computer has already booted and is in a state of not executing any job, the waiting time being obtained by subtracting the boot latency from a time difference between a scheduled end time stored in the memory and a present time, the scheduled end time being a time point at which the first job is scheduled to be ended; and
   performing power-on control of powering on the second computer when power of the second computer is off and when the second energy consumption becomes equal to or less than a threshold value determined based on the first energy consumption.

6. A non-transitory computer-readable recording medium having stored therein a program that causes a computer to execute a process, the process comprising:
   calculating a first energy consumption of a first computer, the first energy consumption being energy to be consumed during a boot latency when the first computer has already booted and is in a state of not executing any job, the boot latency being a length of time taken for boot of a second computer scheduled to execute a second job together with the first computer after a an end of a first job executed by the first computer;
   calculating a second energy consumption of the second computer, the second energy consumption being energy to be consumed during a waiting time when the second computer has already booted and is in a state of not executing any job, the waiting time being obtained by subtracting the boot latency from a time difference between a scheduled end time stored in the memory and a present time, the scheduled end time being a time point at which the first job is scheduled to be ended; and
   performing power-on control of powering on the second computer when power of the second computer is off and when the second energy consumption becomes equal to or less than a threshold value determined based on the first energy consumption.

* * * * *